United States Patent
Kito et al.

(10) Patent No.: US 7,733,844 B2
(45) Date of Patent: Jun. 8, 2010

(54) PACKET FILTERING APPARATUS, PACKET FILTERING METHOD, AND COMPUTER PROGRAM PRODUCT

(75) Inventors: Toshiyuki Kito, Tokyo (JP); Koichiro Akiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1442 days.

(21) Appl. No.: 11/041,407

(22) Filed: Jan. 25, 2005

(65) Prior Publication Data

US 2005/0265343 A1 Dec. 1, 2005

(30) Foreign Application Priority Data

May 26, 2004 (JP) ............................. 2004-156695

(51) Int. Cl.
H04L 12/28 (2006.01)
H04L 12/66 (2006.01)
H04L 12/56 (2006.01)

(52) U.S. Cl. ..................... 370/351; 370/352; 370/389

(58) Field of Classification Search ................ 370/259, 370/260, 261, 351, 352
See application file for complete search history.

(56) References Cited

U.S. PATENT DOCUMENTS

| 7,061,899 B2 * | 6/2006 | Walker et al. ............... 370/351 |
| 2003/0128696 A1 * | 7/2003 | Wengrovitz et al. ......... 370/352 |
| 2005/0068935 A1 * | 3/2005 | Bajko et al. ................. 370/351 |

FOREIGN PATENT DOCUMENTS

| JP | 9-214556 | 8/1997 |
| JP | 11-205388 | 7/1999 |
| JP | 2000-29799 | 1/2000 |
| JP | 2002-158699 | 5/2002 |
| JP | 2002-319938 | 10/2002 |
| JP | 2002-342276 | 11/2002 |
| JP | 2003-143336 | 5/2003 |
| JP | 2003-204358 | 7/2003 |
| JP | 2003-289337 | 10/2003 |
| JP | 2003-304289 | 10/2003 |
| JP | 2003-324458 | 11/2003 |
| JP | 2004-96246 | 3/2004 |

OTHER PUBLICATIONS

Network Working Group, RFC 2401, "Security Architecture for the Internet Protocol", Nov. 1998.*

* cited by examiner

*Primary Examiner*—Salman Ahmed
*Assistant Examiner*—Blanche Wong
(74) *Attorney, Agent, or Firm*—Oblon, Spivak, McClelland, Maier & Neustadt, L.L.P.

(57) ABSTRACT

A packet filtering apparatus includes a first network interface which receives a first packet from a communication device located in a first network, and a sender information acquiring unit which acquires sender information including at least one of security information about the communication device and authentication information about a user of the communication device. The packet filtering apparatus also includes an evaluation information creator which creates evaluation information indicating security evaluation of the communication device based on an evaluation criterion for the sender information, an evaluation information adder which adds the evaluation information to the first packet to generate a second packet, and a second network interface which transmits the second packet to a second network.

2 Claims, 20 Drawing Sheets

SETTING OF USER AUTHENTICATION

ID

0001

INPUT CURRENT PASSWORD

******

INPUT NEW PASSWORD

RE-INPUT NEW PASSWORD FOR CONFIRMATION

SET PUBLIC KEY/ CERTIFICATE

C¥key.txt     REFERENCE

REGISTER

FIG.5

SETTING OF CRITERIA SETTING

CRITERION SUBJECT: ANTIVIRUS VERSION ▼

EVALUATION CRITERION: ≧3.0

EVALUATION VALUE: A

[REGISTER]

FIG.6

SETTING OF RECEPTION POLICY

TRANSMISSION DESTINATION ADDRESS:

PORT:

USER AUTHENTICATION:

ANTIVIRUS VERSION:

PATCHING VERSION:

PACKET TRANSMISSION QUANTITY:

[REGISTER]

FIG.7

| CLIENT | ANTIVIRUS VERSION | PATCHING VERSION | PACKET TRANSMISSION QUANTITY |
|---|---|---|---|
| 192.168.0.3 | 1.2 | 0.9 | 8998 |
| 192.168.0.4 | 2.3 | 2.2 | 5988 |
| 192.168.0.5 | - | 1.2 | 102569 |
| 192.168.0.6 | ? | 2.2 | 25643 |
| : | : | : | : |

FIG.8

| ID | PASSWORD | PUBLIC KEY/ CERTIFICATE |
|---|---|---|
| 0001 | kofdk | skdcafidl7739di...... |
| 0002 | dkadif | d8akdva122dab...... |
| 0003 | dkd9dk | biaev10aiwvlibi...... |
| : | : | : |

FIG.9

| EVALUATION SUBJECT | EVALUATION CRITERION | EVALUATION VALUE |
|---|---|---|
| USER AUTHENTICATION | PUBLIC KEY AUTHENTICATION | A |
| USER AUTHENTICATION | PASSWORD | B |
| USER AUTHENTICATION | FAILURE | C |
| ANTIVIRUS VERSION | $\geq 3.0$ | A |
| ANTIVIRUS VERSION | $\geq 2.0$ | B |
| ANTIVIRUS VERSION | $\geq 1.0$ | C |
| ANTIVIRUS VERSION | INSTALLED | D |
| ANTIVIRUS VERSION | NOT INSTALLED | E |
| PATCHING VERSION | $\geq 2.0$ | A |
| PATCHING VERSION | $\geq 1.0$ | B |
| PATCHING VERSION | $\geq 0.0$ | C |
| PATCHING VERSION | UNKNOWN | D |
| PACKET TRANSMISSION QUANTITY | < 10000 | A |
| PACKET TRANSMISSION QUANTITY | < 100000 | B |
| PACKET TRANSMISSION QUANTITY | $\geq 100000$ | C |

FIG.10

| IP ADDRESS | PORT NUMBER | USER AUTHENTICATION | ANTIVIRUS VERSION | PATCHING VERSION | PACKET TRANSMISSION QUANTITY |
|---|---|---|---|---|---|
| 192.168.0.5 | 443 | C | A | A | A |
| 192.168.0.3 | 23 | C | C | B | B |
| 192.168.0.4 | - | A | A | A | A |
| - | 1030 | C | C | A | A |
| - | - | C | C | B | C |

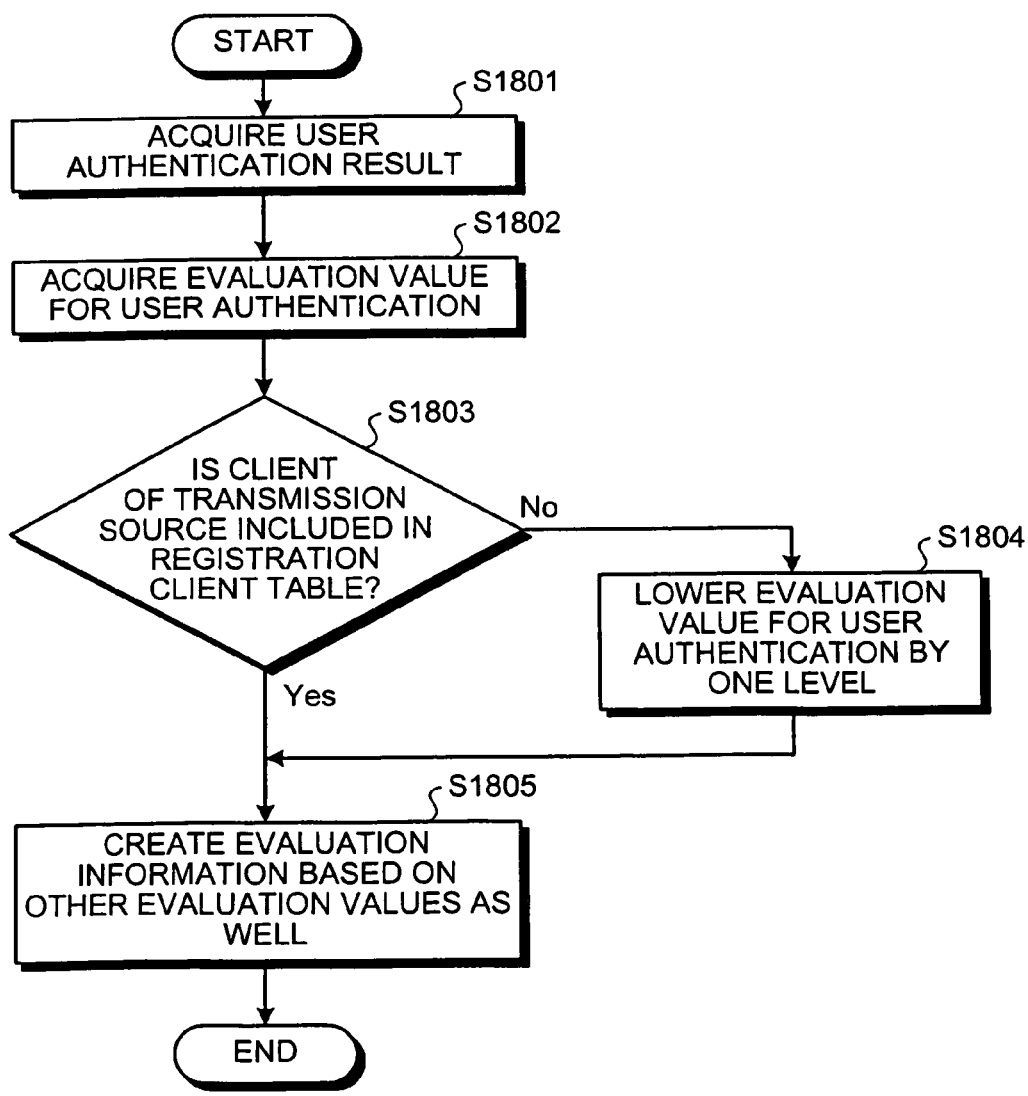

PACKET FILTERING APPARATUS, PACKET FILTERING METHOD, AND COMPUTER PROGRAM PRODUCT

CROSS-REFERENCE TO RELATED APPLICATIONS

This application is based upon and claims the benefit of priority from the prior Japanese Patent Application No. 2004-156695 filed on May 26, 2004 the entire contents of which are incorporated herein by reference.

BACKGROUND OF THE INVENTION

1) Field of the Invention

The present invention relates to an apparatus for and a method of filtering packets transmitted and received over a plurality of networks, and a computer program product for executing the method. More particularly, this invention relates to filtering of a packet to which security evaluation information indicating security evaluation of the packet is added.

2) Description of the Related Art

When secret data such as internal documents is transmitted and received in an enterprise, it is necessary to ensure confidentiality, integrity and authenticity of data. To meet such a demand, several methods using the encryption technology and authentication technology are proposed.

For example, there is a method of ensuring security of data between networks by using a Virtual Private Network (VPN) with the encryption technology and authentication technology taken in.

Besides, there is also a method of ensuring authenticity of data by adding passage information indicating that the packet has passed through a filtering apparatus to a packet when the packet is transmitted and then ensuring at the time of reception that the passage information is added properly (see Japanese Patent Application Laid-Open Publication No. H11-205388).

However, the two methods explained above are for ensuring the confidentiality or authenticity between a network as being a sender and a network as being a receiver, but not for ensuring the authenticity concerning a user or a communication device which has transmitted a packet. Specifically, even if a packet is transmitted by a communication device which is poor in reliability in view of security within the sender network or by a spoofing user using a communication device, the receiver network receives the packet to be appropriate. Therefore, damage may be caused despite appropriate receipt of the packet. In other words, there is a problem that the receiver network cannot acquire information concerning the security of the communication device of the packet transmission source or the user using the communication device, therefore check the security of the packet.

SUMMARY OF THE INVENTION

It is an object of the present invention to at least solve the problems in the conventional technology.

A packet filtering apparatus according to one aspect of the present invention includes a first network interface receiving a first packet from a communication device located in a first network; a sender information acquiring unit acquiring sender information including at least one of security information about the communication device and authentication information about a user of the communication device; an evaluation information creator creating evaluation information indicating security evaluation of the communication device based on an evaluation criterion for the sender information; an evaluation information adder adding the evaluation information to the first packet to generate a second packet; and a second network interface transmitting the second packet to a second network.

A packet filtering apparatus according to another aspect of the present invention includes a first network interface receiving a first packet from a communication device located in a first network; and a deciding unit determining whether evaluation information included in the first packet is higher than a security criterion. The evaluation information indicates security evaluation of the communication device. The packet filtering apparatus also includes a deleting unit deleting the evaluation information from the first packet to generate a second packet when the evaluation information is higher than the security criterion; and a second network interface transmitting the second packet to a second network.

A packet filtering apparatus according to still another aspect of the present invention includes a first network interface receiving a first packet from a first communication device located in a first network; a sender information acquiring unit acquiring sender information including at least one of security information about the first communication device and authentication information about a user of the first communication device; an evaluation information creator creating evaluation information indicating security evaluation of the first communication device based on an evaluation criterion for the sender information; an evaluation information adder adding the evaluation information to the first packet to generate a second packet; and a second network interface transmitting the second packet to a second network and receiving a third packet from a second communication device located in the second network. The packet filtering apparatus also includes a deciding unit determining whether the evaluation information included in the first packet is higher than a security criterion, the evaluation information indicating security evaluation of the second communication device; and a deleting unit deleting the evaluation information from the first packet to generate a fourth packet when the evaluation information is higher than the security criterion. The first network interface transmits the fourth packet to the first network.

A packet filtering method according to still another aspect of the present invention includes receiving a first packet from a communication device located in a first network; acquiring unit acquiring sender information including at least one of security information about the communication device and authentication information about a user of the communication device; creating evaluation information indicating security evaluation of the communication device based on an evaluation criterion for the sender information; adding the evaluation information to the first packet to generate a second packet; and transmitting the second packet to a second network.

A packet filtering method according to still another aspect of the present invention includes receiving a first packet from a communication device located in a first network; determining whether evaluation information included in the first packet is higher than a security criterion, the evaluation information indicating security evaluation of the communication device; deleting the evaluation information from the first packet to generate a second packet when the evaluation information is higher than the security criterion; and transmitting the second packet to a second network.

A packet filtering method according to still another aspect of the present invention includes receiving a first packet from a first communication device located in a first network;

acquiring unit acquiring sender information including at least one of security information about the first communication device and authentication information about a user of the first communication device; creating evaluation information indicating security evaluation of the first communication device based on an evaluation criterion for the sender information; adding the evaluation information to the first packet to generate a second packet; transmitting the second packet to a second network; receiving a third packet from a second communication device located in the second network; determining whether the evaluation information included in the first packet is higher than a security criterion, the evaluation information indicating security evaluation of the second communication device; deleting the evaluation information from the first packet to generate a fourth packet when the evaluation information is higher than the security criterion; and transmitting the fourth packet to the first network.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 shows a screen displayed on a Web browser for an administrator to set an evaluation criterion and an evaluation value with respect to an evaluation subject;

FIG. 6 shows a screen displayed on a Web browser for an administrator to set a security criterion in packet reception;

FIG. 7 shows a configuration example of a client security table according to the first embodiment;

FIG. 8 shows a configuration of a user authentication table according to the first embodiment;

FIG. 9 shows a configuration of an evaluation criterion table according to the first embodiment;

FIG. 10 shows a configuration of a reception policy according to the first embodiment;

FIG. 18 shows a configuration example of a registration client table according to the second embodiment;

FIG. 19 is a flowchart that depicts a processing procedure for generation of evaluation information conducted by an evaluation information generator in a packet filtering apparatus according to the second embodiment;

DETAILED DESCRIPTION

Exemplary embodiments of a packet filtering apparatus and a packet filtering method relating to the present invention will be explained in detail below with reference to the accompanying drawings.

Figure 1:
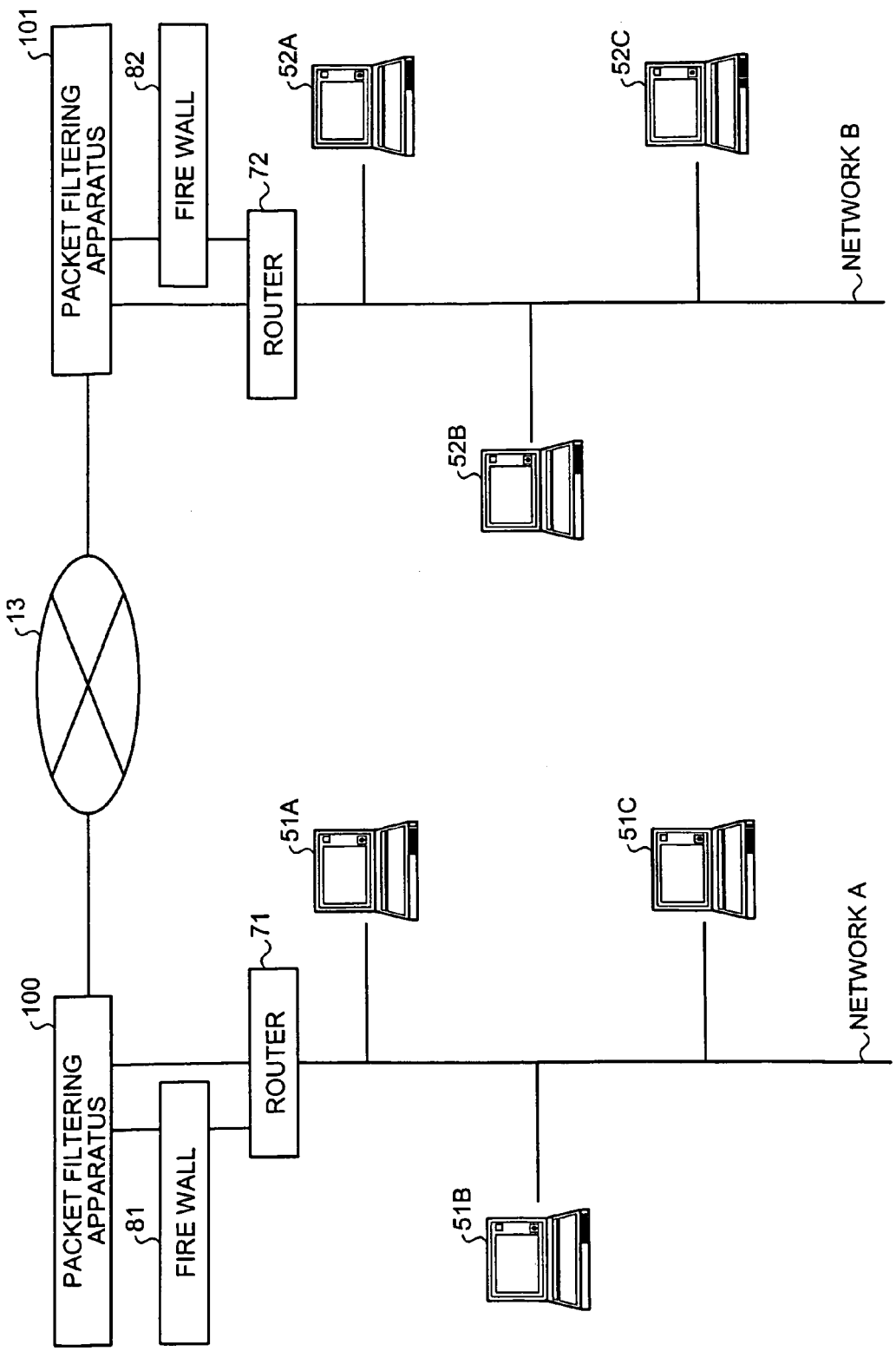
FIG. 1 shows a configuration of a network according to a first embodiment.

FIG. 1 shows a configuration of a network to which a packet filtering apparatus and a packet filtering method according to a first embodiment is applied. In FIG. 1, a network A and a network B are connected to each other via a public network 13. A set of a router 71 and a firewall 81 and another set of a router 72 and a firewall 82 are installed in respective networks. Clients 51A to 51C and 52A to 52C are installed via the routers 71 and 72. The network A and network B may be connected through the VPN.

Since a packet filtering apparatuses 101 is the same as a packet filtering apparatus 100 in processing to be executed, only the packet filtering apparatus 100 will now be explained below.

The packet filtering apparatus 100 adds evaluation information, which indicates evaluation concerning security, to a packet, based on information concerning security of the clients 51A to 51C that have transmitted a packet or based on authentication of a user who has transmitted a packet, and transmits the packet with the evaluation information.

Upon receiving a packet from the network B, the packet filtering apparatus 100 determines whether the packet includes the evaluation information, which is explained later in detail. If the packet does not include the evaluation information, the packet filtering apparatus 100 transfers the packet to the firewall 81. If the packet includes the evaluation information, the packet filtering apparatus 100 determines whether the information concerning the security included in the evaluation information or the user authentication satisfies a security criterion. Upon determining the security criterion to be satisfied, the packet filtering apparatus 100 removes the evaluation information from the packet, and then transfers the packet to the clients 51A to 51C as being transmission destination via the router 71. Its detailed configuration and processing procedure will be explained later.

The firewalls 81 and 82 detect and intercept unauthorized access by monitoring whether a packet having no evaluation information is an unauthorized packet. In the present embodiment, a packet having no evaluation information is transmitted to the firewalls 81 and 82. In an alternative embodiment, however, the firewalls 81 and 82 are not installed, and the packet filtering apparatus 100 or 101 may discard a packet having no evaluation information.

The clients 51A to 51C and 52A to 52C are computers, such as personal computers or servers, used by users. The communication devices are not restricted to personal computers or servers, but they may be, for example, mobile terminals such as mobile phones and personal digital assistants (PDAs).

Figure 2:
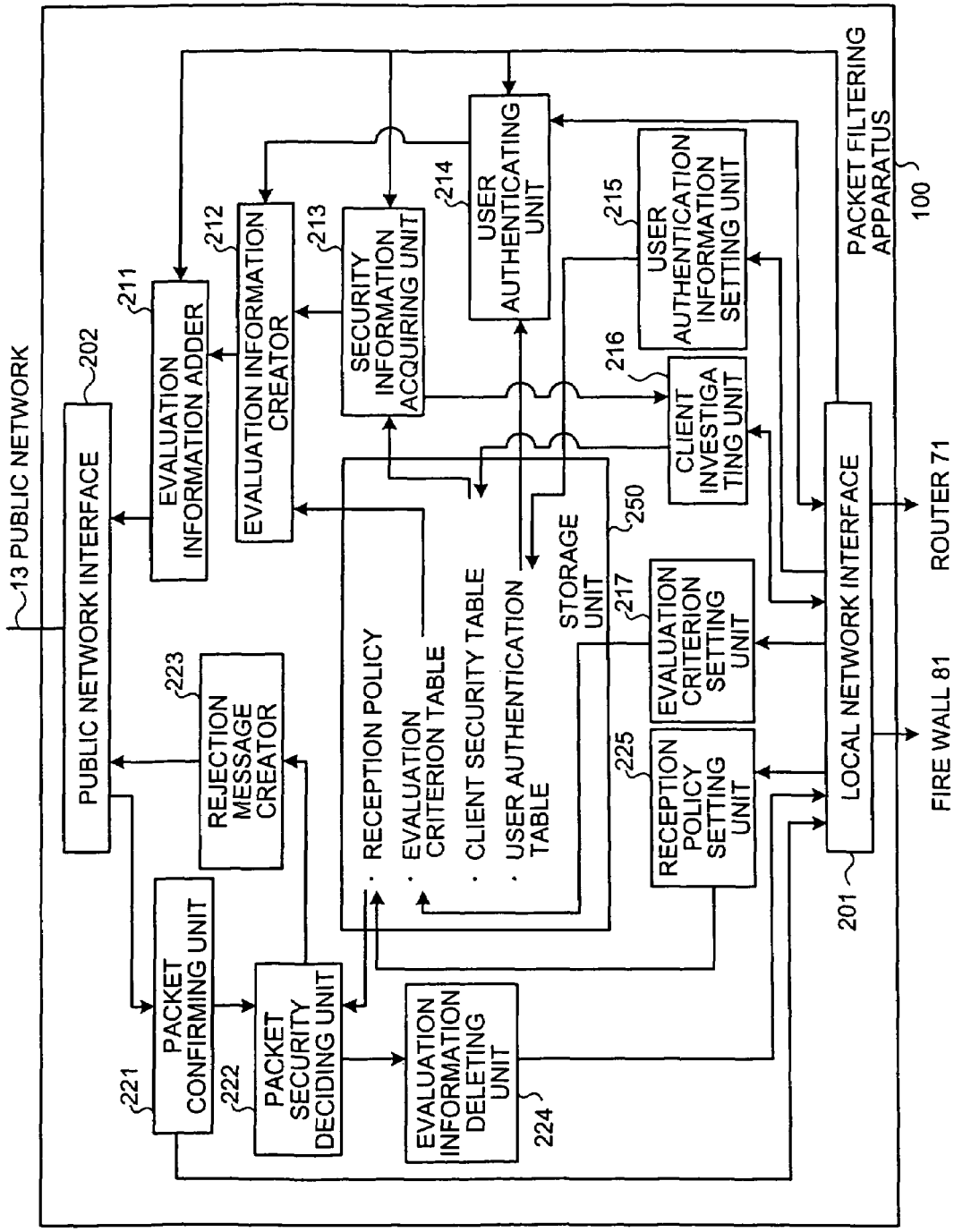
FIG. 2 is a block diagram that depicts a configuration of a packet filtering apparatus according to a first embodiment.

FIG. 2 is a block diagram of the packet filtering apparatus 100 according to the first embodiment. The packet filtering apparatus 100 includes a local network interface 201, a public network interface 202, an evaluation information adder 211, an evaluation information generator 212, a security information acquiring unit 213, a user authenticating unit 214, a user authentication information setting unit 215, a client investigating unit 216, an evaluation criterion setting unit 217, a packet confirming unit 221, a packet security deciding unit 222, a rejection notice generator 223, an evaluation information deleting unit 224, a reception policy setting unit 225, and a storage unit 250. These components allow the packet filtering apparatus 100 to transmit and receive a packet with evaluation information and to determine the security of the packet transmission source.

Figures 3, 4:
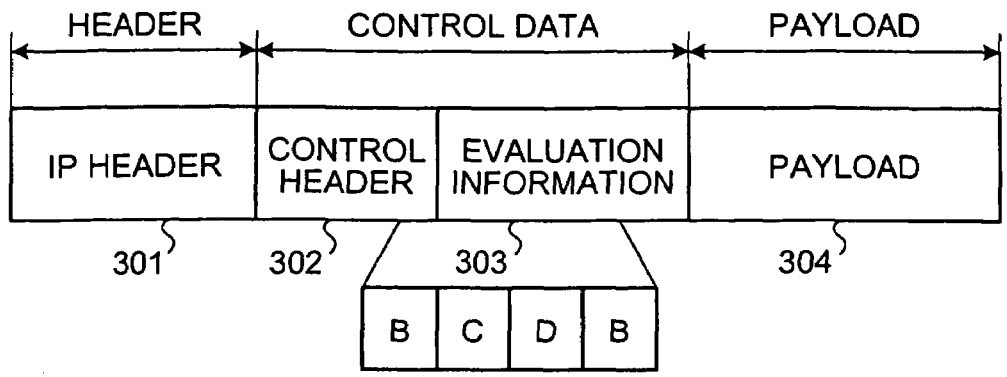
FIG. 3 shows a structure of a packet transmitted and received by a packet filtering apparatus according to the first embodiment.
FIG. 4 shows a screen displayed on a Web browser for a user to alter a password or register a public key.

FIG. 3 shows a structure of a packet transmitted and received by the packet filtering apparatus via the public network 13. An IP header 301 is a header required to conduct network communication using the Internet Protocol. A transmission destination address, a transmission source address, and a port number are described in the IP header 301. Data to be transmitted to the transmission destination is described in a payload 304. Evaluation information 303 generated by the packet filtering apparatus 100 and a control header 302, which identifies the size and type of the evaluation information 303, are inserted in a data region between the IP header 301 and the payload 304. The packet filtering apparatus 100 can determine whether the evaluation information 303 is present by referring to the control header 302. As for specific contents of the evaluation information 303, if an evaluation value of a user authentication result for a user who has transmitted a packet is B and evaluation values included in security information about a client that has transmitted the packet are C, D and B, then B, C, D and B obtained by putting them together become evaluation information.

The portion in which the evaluation information is added to the packet is not restricted between the IP header 301 and the payload 304, but it may be any place as long as it is a predetermined place and it is a place capable of identifying whether there is added evaluation information when the packet filtering apparatus 100 receives a packet. A packet to which evaluation information is added is not restricted to an IP packet, but evaluation information may be added to a packet in any network hierarchy level.

Referring back to FIG. 2, the local network interface 201 conducts packet transmission and reception in conjunction with the clients 51A to 51C, the firewall 81, or the router 71 installed in the network A.

The public network interface 202 conducts packet transmission and reception with another network such as the network B via the public network 13.

A configuration in the packet filtering apparatus 100 required to add evaluation information to a packet and to transmit the resultant packet will be explained next.

The user authenticating unit 214 identifies, from an IP address of the IP header 301 in the packet received, a client which transmits that packet, and conducts user authentication on a user who uses the identified client. As for a method for user authentication, there are authentication using a public key and authentication using a password in the present embodiment. A user authentication result for the user obtained by authentication is output to the evaluation information generator 212. The user authentication is not restricted to authentication using a public key and authentication using a password.

An example of authentication using a public key is explained. The user carries a PC card that incorporates a decryption key to generate the users signature and a chip to generate a signature. When using the client 51A, the user attaches the PC card to the client 51A. If the user transmits a packet from the client 51A, the signature and the user ID generated by the PC card attached to the client 51A are transmitted to the packet filtering apparatus 100 according to a request from the packet filtering apparatus 100. The packet filtering apparatus 100 outputs the received signature and user ID to the user authenticating unit 214 via the local network interface 201. The user authenticating unit 214 conducts authentication on the input signature by using a public key corresponding to the received user ID retained in a user authentication table, which is explained later. If the authentication is successful, the user authenticating unit 214 outputs a notice to that effect to the evaluation information generator 212. It becomes possible to prevent a user from transmitting a packet in the disguise of another person, f the user removes the PC card after using the client 51A. Of course, the authentication using a public key is not restricted to the PC card, but it is conceivable to use an IC card and a card reader.

An example of authentication using a password is explained. If the packet filtering apparatus 100 receives a packet from the client 51A but it does not receive a signature, or if the packet filtering apparatus 100 receives a signature but it fails in authentication using a public key, the packet filtering apparatus 100 issues a request for a user ID and a password to the client 51A. The user inputs the user ID and the password at the client 51A. The user authenticating unit 214 conducts authentication based on whether a set of the user ID and the password input via the local network interface 201 coincides with a set of the user ID and the password associated with the user ID retained in the user authentication table. If the authentication is successful the user authenticating unit 214 outputs a notice to that effect to the evaluation information generator 212. As a result, authentication of the user who has transmitted the packet becomes possible, and it becomes possible to prevent a user from transmitting a packet in the disguise of another person. It takes a lot of time for the user to input the user ID and password each time the user transmits a packet. Therefore, processing such as handling the user as the same user if packets are transmitted without a break from first packet transmission or regarding the authentication as valid only for a given period of time may be conducted.

The security information acquiring unit 213 acquires security information concerning clients 51A to 51C that has transmitted a packet. Specifically, the security information acquiring unit 213 extracts a transmission source IP address from the IP header 301 in the packet, and acquires security information associated with a client indicated by a transmission source IP address from a client security table, which is explained later, stored in the storage unit 250 based on the extracted IP address. If the client security table does not retain the security information concerning the client indicated by the transmission source IP address, the client investigating unit 216 explained later, investigates security concerning the client, and then acquires security information. A detailed procedure for acquisition of the security information is explained later.

The security information is information concerning security in a state in which the client is operated. In the present embodiment, the security information includes a version of patching conducted on the client, a version of antivirus software, and a transfer quantity of packets transmitted for a given period of time. The information about these kinds is retained in the client security table explained later, in association with an IP address indicating the client.

The evaluation information generator 212 generates evaluation information for a packet received from the clients 51A to 51C. The evaluation information generator 212 acquires evaluation values, which indicate security for the result of the user authentication conducted as regards the user who has transmitted the packet by the user authenticating unit 214 and the security information acquired as regards the clients 51A to 51C that has transmitted the packet by the security information acquiring unit 213, from an evaluation criterion table, which is explained later, stored in the storage unit 250, and generates evaluation information about the packet by using the acquired evaluation value. A detailed procedure for acquisition of the evaluation values is explained later.

In the present embodiment, the evaluation information includes evaluation values respectively for user authentication, version information about antivirus software for the client, a patch version for the client, and the transfer quantity of packets transmitted from the client.

The reason why the version of the antivirus software (or the version of the pattern file) is included in the evaluation subjects is that antivirus software having a high version can be judged to have high reliability because the software can protect against an attack of the latest virus. The reason why the patching version of the client is included in the evaluation subjects is that a client having a later patching version can be judged to have high reliability because the security hole is closed up. The reason why the transmission quantity of packets is included in the evaluation subjects is that there is a possibility that a client that is large in packet transmission quantity is attacking other clients and on the contrary a client that is small in packet transmission quantity can be judged to have high reliability.

The evaluation subjects used to generate the evaluation information are not restricted to the user authentication, the client patching information, the version information about the client antivirus software, and the transfer quantity of packets transmitted from the client.

The evaluation information adder 211 adds the evaluation information generated by the evaluation information generator 212 to the packet. Specifically, the evaluation information adder 211 adds the evaluation information to the packet by generating a control header, which identifies the size and type of the evaluation information, based on the evaluation information input from the evaluation information generator 212 and inserting the control header 302 and the evaluation information 303 between the IP header 301 and the payload 304 in the packet input from the local network interface 201.

The user authentication information setting unit 215 conducts a password change or public key registration setting required to conduct authentication using a public key. When the user has registered a password or public key via the user authentication information setting unit 215, the user authentication information setting unit 215 associates a user ID indicating the user with a new password or public key, and updates a user authentication table, which is explained later, stored in the storage unit 250. A configuration of the user authentication table is explained later. Since it is made possible for the user to alter the password or public key, the security is further improved.

FIG. 4 shows a screen displayed on the Web browser for the user to alter a password or register a public key. It becomes possible for the user to alter the password or register the public key by inputting a user ID and the current password. By inputting a new password and clicking "register" when alternating password, the user authentication information setting unit 215 associates the user ID with the new password in the user authentication table. By specifying a file having a public key described therein and clicking a "register" button to register the public key, the user authentication information setting unit 215 registers the public key described in the file in the user authentication table. Since the public key has a large number of bits, it is difficult to make the user input the public key. In the user authentication information setting unit 215, however, a file having a public key described therein can be specified, and consequently an unsuitable public key can be prevented from being set by false inputting.

Referring back to FIG. 2, the client investigating unit 216 investigates patch information concerning the clients 51A to 51C connected to the network A, the version information about the antivirus software, and the transmission quantity of packets within a certain period of time, associates a result of the investigation with an IP address that indicates the client of the investigation subject, and updates the client security table explained later, stored in the storage unit 250. Although the investigation method is not especially restricted, in the present embodiment, investigation on the clients 51A to 51C is automatically conducted at certain intervals. As a result, it becomes possible to suitably acquire information, such as the packet transmission quantity of the clients 51A to 51C. If the security information acquiring unit 213 inputs a notice to the effect that a specific client should be investigated, to the client investigating unit 216, the client investigating unit 216 conducts investigation on a specified client. A configuration of the client security table is explained later.

When an administrator having authority to set an evaluation criterion inputs an evaluation criterion and an evaluation value for an evaluation subject, the evaluation criterion setting unit 217 associates the evaluation subject, the evaluation criterion and the evaluation value with each other, and sets them in an evaluation criterion table, which is explained later, stored in the storage unit 250. Since it is made possible by the evaluation criterion setting unit 217 to alter the evaluation criterion and the evaluation value for the evaluation subject, it becomes possible to suitably set the evaluation criterion and the evaluation value even if there is an alteration in items concerning the security of the clients, such as the latest patching of clients or distribution of a pattern file of antivirus software.

FIG. 5 shows a screen displayed on the Web browser for the administrator to set the evaluation criterion and the evaluation value. This screen is displayed after authentication that the user is an administrator is conducted. Evaluation subjects that can be selected on this screen are the user authentication, the antivirus version, the patching version, and the packet transmission quantity. When the user inputs the evaluation criterion and the evaluation value for the selected evaluation subject and clicks a "register" button, the evaluation criterion setting unit 217 sets the input values in the evaluation criterion table explained later, in association with each other.

The evaluation value is represented by an alphabetic letter beginning with A. "A" represents the highest evaluation. As for the antivirus version, patching version and packet transmission quantity, the evaluation criterion is set by using a numerical value and a sign of equality. For example, "≧3.0" indicates a version greater than 3.0. In the present embodiment, evaluation criteria that can be selected at the time of user authentication are only "public key," "password," and "failure."

A configuration required to judge the security based on the received packet evaluation information in the packet filtering apparatus 100 is explained.

Referring back to FIG. 2, the packet confirming unit 221 determines whether a packet input from the public network interface 202 has evaluation information added thereto. The packet confirming unit 221 outputs a packet having evaluation information added thereto to the packet security deciding unit 222, and transmits a packet having no evaluation information added thereto to the firewall 81 via the local network interface 201.

The packet security deciding unit 222 makes a decision whether the security of the received packet is high by making a decision whether the evaluation value for the evaluation subject in the evaluation information added to the packet is higher than the security criterion for the reception policy stored in the storage unit 250. The packet security deciding unit 222 outputs a packet judged to be higher than the security criterion to the evaluation information deleting unit 224. The packet security deciding unit 222 discards a packet judged to be lower than the security criterion, and outputs a notice to that effect to the rejection notice generator 223. A detailed decision method is explained later.

The rejection notice generator 223 rejects to transfer a packet judged to be lower than the security criterion to its transmission destination, generates a transfer rejection notice to the effect that the packet is discarded, and transmits the transfer rejection notice to the transmission source of the packet via the public network interface 202.

By receiving this transfer rejection notice, a transmitter who has transmitted the packet can know that the packet is not transmitted as far as the transmission destination. The method of indicating that the transfer is rejected to the transmitter may be any method. For example, when a client has received a transfer rejection notice, a window having a message to that effect may be displayed.

The evaluation information deleting unit 224 deletes evaluation information and a control header to be used to control the evaluation, from a packet judged to be higher than the security criterion. Specifically, the evaluation information deleting unit 224 ascertains the size of the evaluation information based on the control header, deletes the control header and the evaluation information suitably, and generates a packet including the IP header 301 and the payload 304. Although the security is confirmed based on the security of the client of the packet transmission source or user authentication, therefore, it becomes possible for a client of the transmission destination to receive a packet and conduct processing as usual, without the need to determine whether the packet has evaluation information added thereto.

The reception policy setting unit 225 sets and registers an IP address, a port, an evaluation subject and a criterion value input by an administrator having authority to set a reception policy, in association with a reception policy, which is explained, stored in the storage unit 250. Since it becomes possible to alter the reception policy by using the reception policy setting unit 225, it becomes possible to set a suitable security criterion when a change has occurred in the network environment such as prevalence of a virus, when an alteration is conducted in the version of antivirus software of the client, and when a computer serving as a client is newly introduced.

FIG. 6 shows a screen displayed on the Web browser for the administrator to set a security criterion in packet reception. This screen is displayed after the authentication to the effect that the user is an administrator is conducted. Upon inputting an IP address and a port number that indicate the subject of security criterion setting in this screen, inputting criterion values that indicate security criteria concerning the user authentication, antivirus version, patching version and packet transmission quantity with respect to the setting subject, and clicking a "register" button, the reception policy setting unit 225 associates these values with a reception policy, which is explained later, and sets them.

The storage unit 250 stores the reception policy, evaluation criterion table, client security table and user authentication table required to generate the evaluation information or judge the security of a received packet in the packet filtering apparatus.

FIG. 7 shows a configuration example of the client security table. The client security table retains an IP address indicating a client, antivirus version, patching version, and packet transmission quantity in association. By retaining information that indicates the security of each client, such as the antivirus version, patching version and packet transmission quantity, it is made possible to acquire the security information about each client rapidly and precisely at the time of evaluation information generation.

FIG. 8 shows a configuration of the user authentication table. The user authentication table retains the user ID, password and public key in association.

FIG. 9 shows a configuration of the evaluation criterion table. The evaluation criterion table retains the evaluation subject, evaluation criterion and evaluation value in association.

FIG. 10 shows a configuration of a reception policy. The reception policy retains the IP address, port number, evaluation subject and evaluation value in association. When the IP address and the port number that represent the transmission destination of the received packet coincide with a record retained in the reception policy, the packet security deciding unit 222 makes a decision whether the criterion of the security is satisfied, by using this record.

As for the reception policy, it is necessary to input a criterion value for the evaluation subject without fail, but the IP address and the port number may be set as occasion demands. An example is explained with reference to FIG. 10. '192.168.0.4' represents a client having high security, and high criterion values are set for any evaluation subject and all port numbers. For a specific port number, such as '1030,' user authentication is not required irrespective of the client, and consequently a low criterion value is set for user authentication, but high criterion values are set for other evaluation subjects. Besides, it is conceivable that the security of the lowest limit is judged on packets that do not come under other set necessary conditions by refraining from specifying the client and port number (having '-' for both the client and port number in the record).

Figure 11:
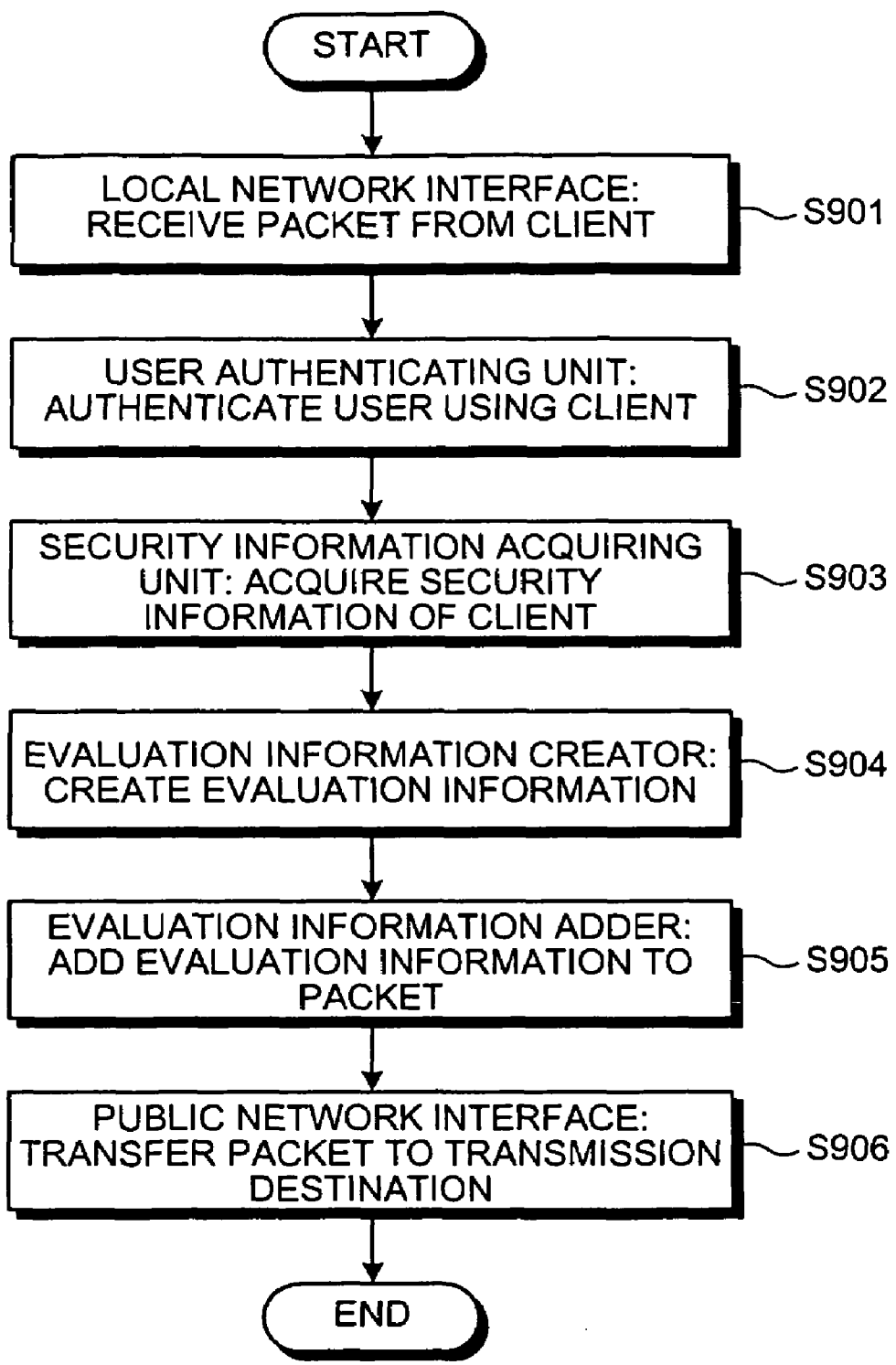
FIG. 11 is a flowchart that depicts a processing procedure conducted in a packet filtering apparatus according to the first embodiment since reception of a packet from a client until addition and transmission of evaluation information.

There is explained processing conducted in the packet filtering apparatus 100 according to the present embodiment having configurations heretofore explained since a packet is received from a client 51A until evaluation information is added and transmitted. FIG. 11 is a flow chart that depicts general processing conducted in the packet filtering apparatus 100, since a packet is received from the clients 51A to 51C until evaluation information is added and transmitted.

The local network interface 201 receives a packet to be transmitted to the client 52A to C in the network B, from the clients 51A to 51C (step S901).

The user authenticating unit 214 identifies a client that has transmitted the packet, based on the IP address in the IP header 301 in the received packet, via the local network interface 201 (in the present flow chart, it is supposed that the identified client is the client 51A), and conducts user authentication on the user using the client 51A (step S902). A specific processing procedure for the user authentication is explained later.

The security information acquiring unit 213 identifies a client that has transmitted the packet, based on the IP address in the IP header 301 in the received packet, via the local network interface 201 (in the present flow chart, it is supposed that the identified client is the client 51A), and acquires the security information about the client 51A from the client security table stored in the storage unit 250 (step S903). A specific processing procedure for acquisition of security information is explained later.

The evaluation information generator 212 gives evaluation values for the user authentication, antivirus version, patching version and packet transmission quantity based on the result of the user authentication conducted by the user authenticating unit 214 and the security information acquired by the security information acquiring unit 213, and generates evaluation based on these evaluation values (step S904). A specific processing procedure for acquisition of evaluation values is explained later.

The evaluation information adder 211 inserts evaluation information generated by the evaluation information generator 212, between the IP header 301 and the payload 304 in the packet received from the client 51A together with the control header 302, and thus adds the evaluation information to the packet (step S905). The evaluation information adder 211 generates the control header 302 based on the size of the evaluation information.

The public network interface 202 transmits the packet having the evaluation information added thereto by the evaluation information adder 211, to the network B via the public network 13 (step S906).

Owing to the processing heretofore explained, it becomes possible to add the evaluation information to the packet received from the clients 51A to 51C and transmit the resultant packet. While in the present embodiment the evaluation information is generated based on both the user authentication and the security information about the client, the evaluation information may be generated based on either one of them or based on other necessary conditions besides them.

Figure 12:
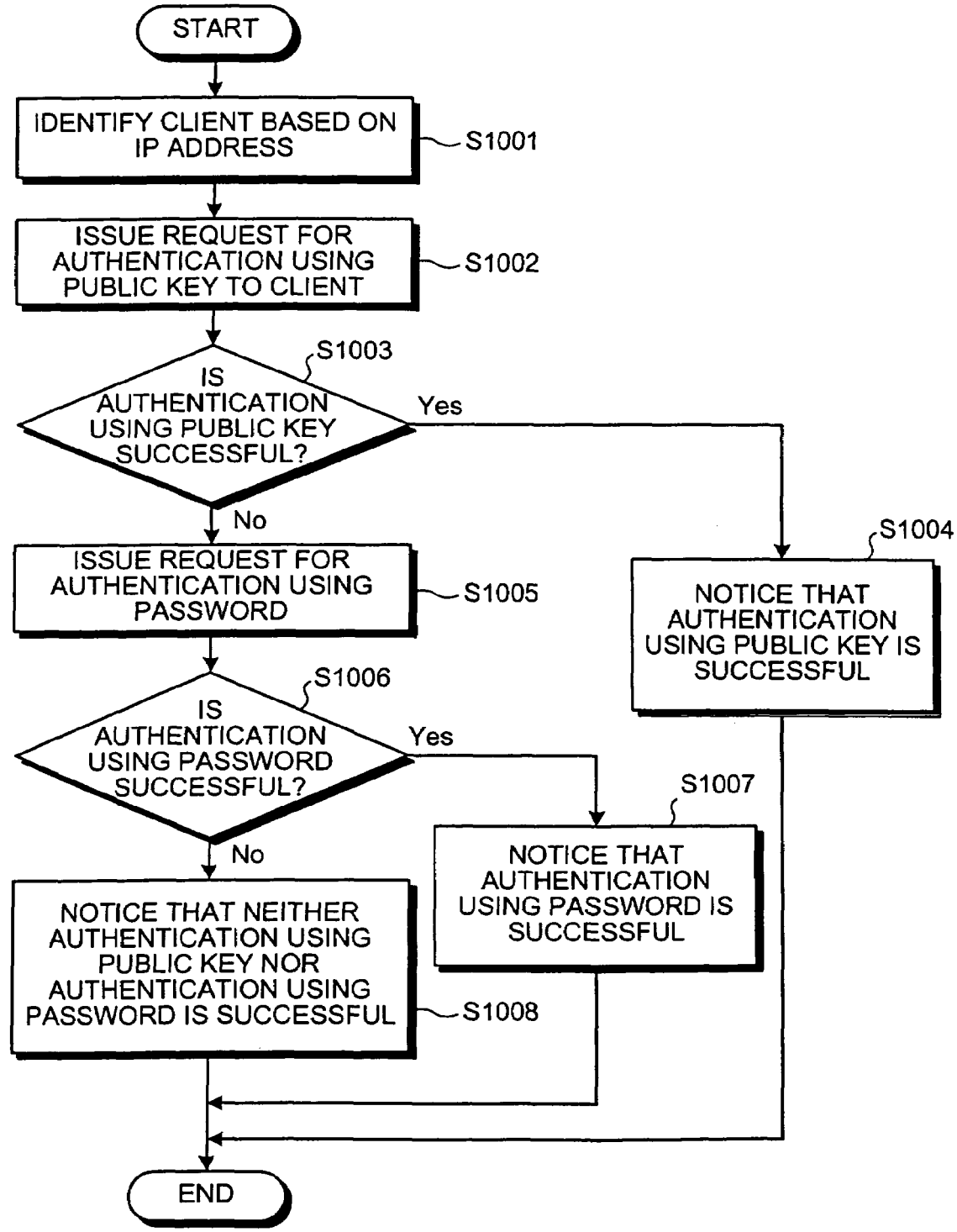
FIG. 12 is a flowchart that depicts a processing procedure for user authentication conducted in a user authenticating unit in a packet filtering apparatus according to the first embodiment.

Detailed processing of the user authentication conducted at step S902 in FIG. 11 is explained. FIG. 12 is a flowchart that depicts a processing procedure for the user authentication conducted in the user authenticating unit 214 in the packet filtering apparatus 100 according to the present embodiment.

The user authenticating unit 214 identifies any one of the clients 51A to 51C based on the IP address in the IP header 301 in the received packet (step S1001). In the present flow chart, it is supposed that the identified client is the client 51A for the purpose of explanation. The user authenticating unit 214 issues a request for authentication using a public key to the client 51A (step S1002).

If the client 51A has a PC card required to generate a signature and attached thereto, the client 51A transmits a signature and a user ID generated by this PC card to the packet filtering apparatus 100. If the client 51A does not have a PC card attached thereto, the client 51A transmits a notice to the effect that a signature cannot be generated to the packet filtering apparatus 100.

If the signature and the user ID are transmitted from the client 51A, the user authenticating unit 214 conducts authentication by using a public key retained in the user authentication table stored in the storage unit 250, and determines whether authentication is successful (step S1003). Not only when the authentication of the public key is unsuccessful, but also when a notice to the effect that the signature cannot be generated is not received or the signature and the user ID are not received, the user authenticating unit 214 judges that authentication is unsuccessful (No at step S1003).

If the user authenticating unit 214 judges that authentication using a public key is successful (Yes at step S1003), the user authenticating unit 214 outputs a notice to the effect that authentication using a public key is successful, to the evaluation information generator 212 (step S1004).

If the user authenticating unit 214 judges that authentication using a public key is unsuccessful (No at step S1003), the user authenticating unit 214 issues a request for the user ID and password to the client 51A (step S1005). If the user ID and password received from the client 51A coincide with a user ID and a password retained in the user authentication table, the user authentication table judges that the authentication using the password is successful. If the received user ID and password do not coincide with a user ID and a password retained in the user authentication table, or a user ID and a password are not received from the client 51A within a given period of time, the user authenticating unit 214 judges that the authentication is unsuccessful (step S1006).

Upon judging the authentication using a password to be successful (Yes at step S1006), the user authenticating unit 214 sends a notice to the effect that the authentication using a password is successful to the evaluation information generator 212 (step S1007). Upon judging the authentication using a password to be unsuccessful (No at step S1006), the user authenticating unit 214 outputs a notice to the effect that both authentication using a public key and authentication using a password are unsuccessful, to the evaluation information generator 212 (step S1008).

In the present embodiment, the authentication using a public key is first conducted, and the authentication using a password is conducted after the authentication using a public key has failed. Alternatively, the authentication using a password may be conducted earlier, or user authentication using either a password or a public key may be conducted. Further, authentication using a different item may be conducted. By conducting the user authentication according to the processing procedure shown in FIG. 12, it becomes possible to prevent a user from transmitting a packet in the disguise of another person, even at a client after the user has logged in there.

Figure 13:
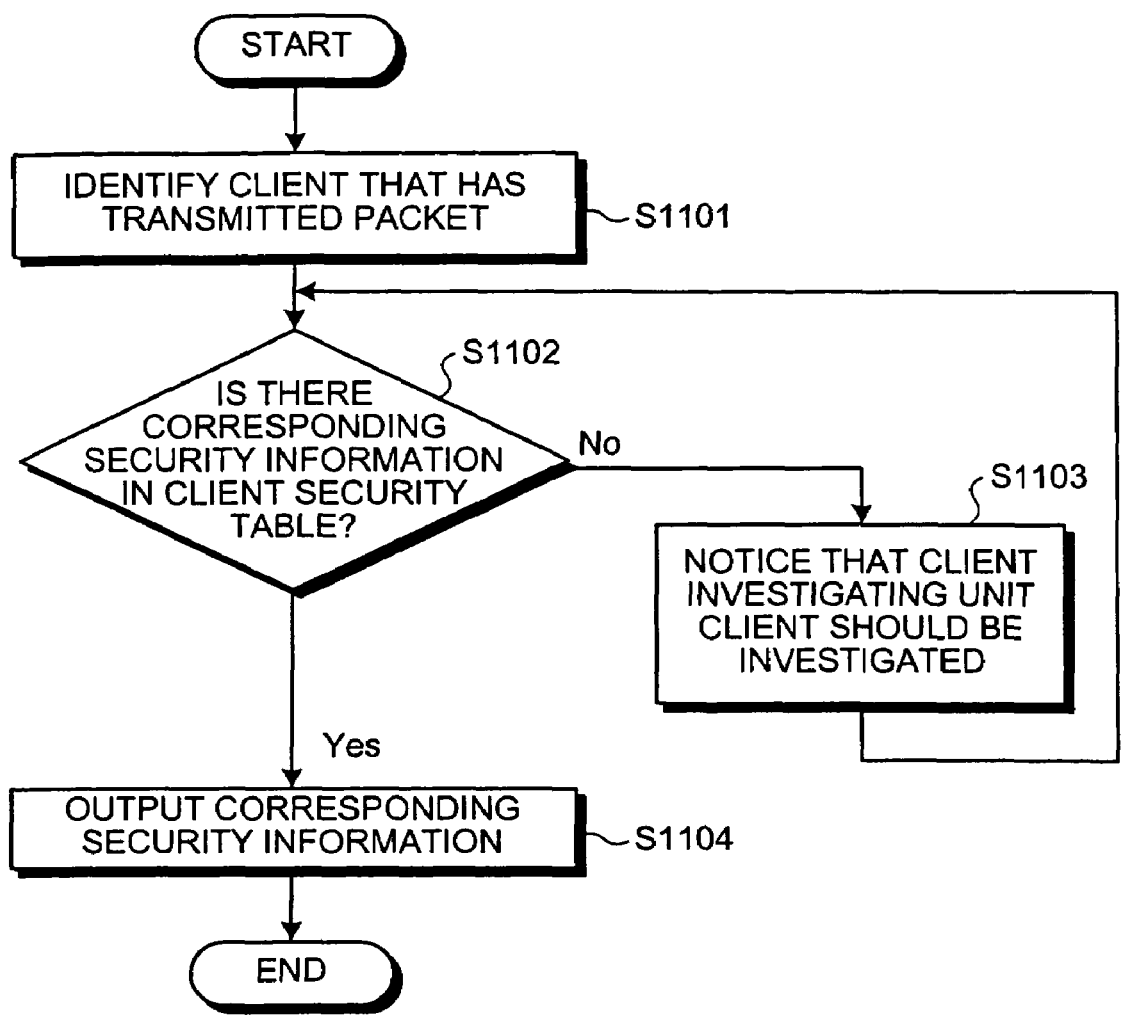
FIG. 13 is a flowchart that depicts a processing procedure for acquisition of security information conducted in a security information acquiring unit in a packet filtering apparatus according to the first embodiment.

Detailed processing of acquiring security information conducted at step S903 shown in FIG. 11 is explained. FIG. 13 is a flow chart that depicts a processing procedure for security information acquisition conducted in the security information acquiring unit 213 in the packet filtering apparatus 100 according to the present embodiment.

The security information acquiring unit 213 identifies a client based on the IP address in the IP header 301 in the received packet (step S1101). In the present flow chart, it is supposed that the identified client is the client 51A. The security information acquiring unit 213 determines whether security information about the client 51A is retained in the client security table stored in the storage unit 250 (step S1102).

Upon judging that the security information about the client 51A is not stored in the client security table (No at step S1102), the security information acquiring unit 213 outputs a notice to the effect that the security of the client 51A should be investigated, to the client investigating unit 216 (step S103). After a predetermined time has elapsed, the security information acquiring unit 213 determines again whether security information about the client 51A is retained in the client security table stored in the storage unit 250 (step S102). The predetermined time is time required for the client investigating unit 216 to investigate the client 51A and register a result of the investigation in the client security table as security information.

Upon judging that the security information about the client 51A is stored in the client security table (Yes at step S1102), the security information acquiring unit 213 acquires the security information about the client 51A, that is, the antivirus version, the patching version and the packet transmission quantity associated with the IP address, and outputs the security information to the evaluation information generator 212 (step S1104).

If the client security table retains the security information concerning the client, the security information acquiring unit 213 can acquire the security information concerning the client rapidly owing to the procedure heretofore explained. Since it is not necessary to investigate the client whenever a packet is transmitted, the processing conducted in the packet filtering apparatus 100 is reduced. Even if the client security table does not retain the security information concerning the client, it becomes possible for the security information acquiring unit 213 to acquire the security information suitably, because the client investigating unit 216 conducts the investigation. Acquisition of the security information in the packet filtering apparatus 100 is not restricted to acquisition from the client security table, but any method may be used as long as security information can be acquired suitably from the client that has transmitted the packet.

There is explained processing conducted at step S904 in FIG. 11 until the evaluation information generator 212 acquires the evaluation value included in the evaluation information. The evaluation information generator 212 uses the evaluation criterion table stored in the storage unit 250 to acquire the evaluation value, makes a decision according to the evaluation criterion retained in the evaluation criterion table, and sets the evaluation table.

Figure 14:
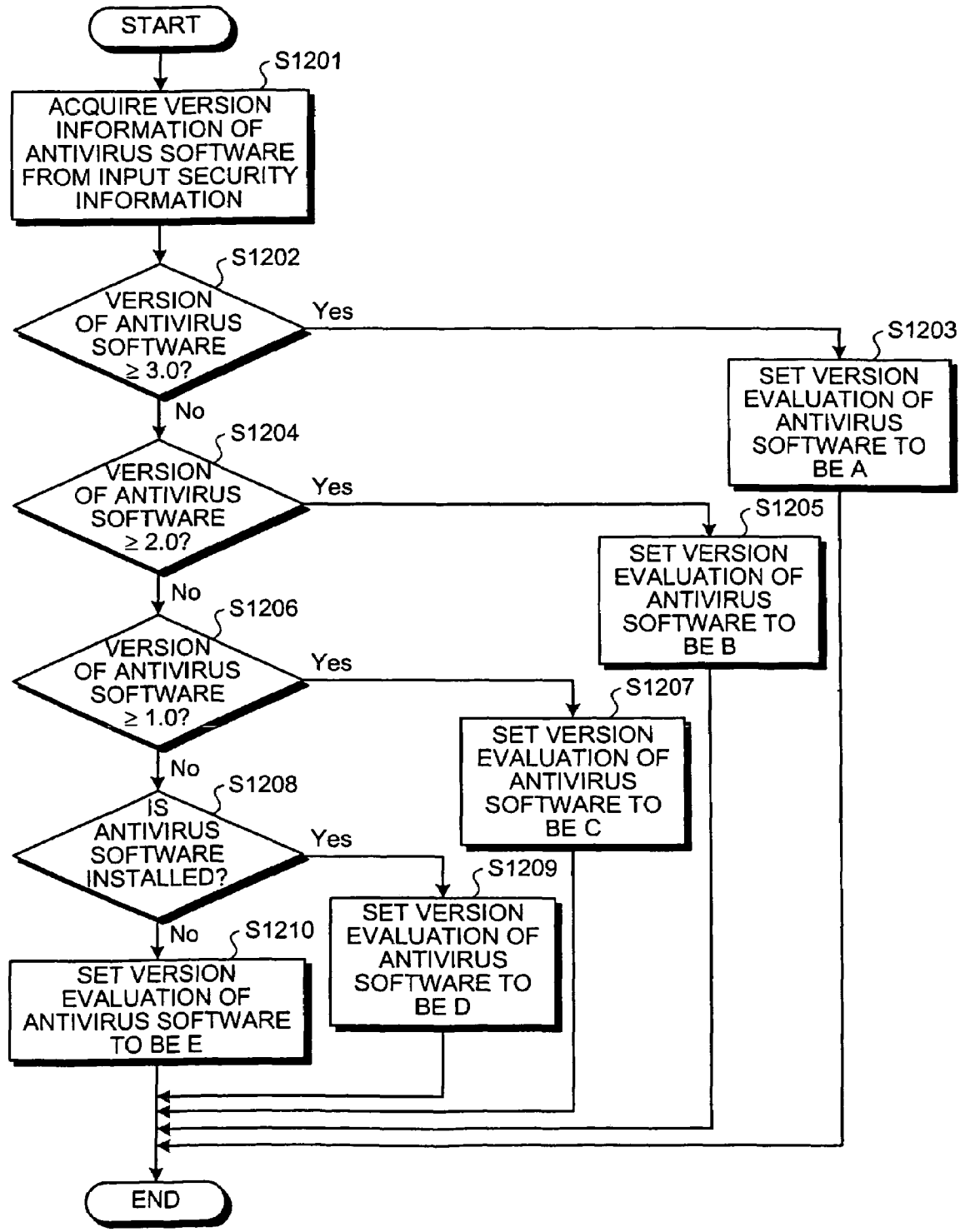
FIG. 14 is a flowchart that depicts a processing procedure for acquisition of an evaluation value for a version of antivirus software included in evaluation information conducted by an evaluation information generator 212 according to the first embodiment.

FIG. 14 is a flowchart that depicts a processing procedure for acquisition of an evaluation value for the antivirus software version included in the evaluation information conducted by the evaluation information generator 212 according to the present embodiment.

The evaluation information generator 212 acquires the version information about the antivirus software from the security information about the client input from the security information acquiring unit 213 (step S1201).

Since a evaluation criterion "≧3.0" is associated with an evaluation value "A" in the evaluation criterion table, the evaluation information generator 212 first determines whether the acquired version information is at least 3.0 (step S1202). Upon judging the version information to be at least 3.0 (Yes at step S1202), the evaluation information generator 212 sets the evaluation value for the antivirus version to 'A' (step S1203). In the ensuing processing as well, the evaluation information generator 212 determines whether a evaluation criterion is satisfied and sets an evaluation value based on the evaluation criteria and evaluation values retained in the evaluation criterion table.

In other words, if the version information is not judged to be at least 3.0 (No at step S1202), the evaluation information generator 212 determines whether the acquired version information is at least 2.0 (step S1204). If the version information is judged to be at least 2.0 (Yes at step S1204), the evaluation information generator 212 sets the evaluation value for the antivirus version to 'B' (step S1205).

If the version information is not judged to be at least 2.0 (No at step S1204), the evaluation information generator 212 determines whether the acquired version information is at least 1.0 (step S1206). If the version information is judged to be at least 1.0 (Yes at step S1206), the evaluation information generator 212 sets the evaluation value for the antivirus version to 'C' (step S1207).

If the version information is not judged to be at least 1.0 (No at step S1206), the evaluation information generator 212 determines whether antivirus software is installed although the version in the acquired version information is unknown (step S1208). If the antivirus software is judged to be already installed (Yes at step S1208), the evaluation information generator 212 sets the evaluation value for the antivirus version equal to 'D' (step S1209). If the antivirus software is judged not to be installed (No at step S1208), the evaluation information generator 212 sets the evaluation value for the antivirus version to 'E' (step S1210).

As for the patching versions and packet transmission quantities that become other evaluation subjects as well, evaluation values are acquired according to procedures similar to the evaluation value acquisition procedure of the antivirus software version.

As for the evaluation value for the user authentication, a suitable evaluation value is acquired from the evaluation criterion table based on success in authentication using 'public key', success in authentication using 'password', or 'failure' in both authentication using a public key and authentication using a password, output from the user authenticating unit 214.

In this way, the evaluation information generator 212 sets an evaluation value for each evaluation subject based on the evaluation criteria and evaluation values retained in the evaluation criterion table. Therefore, it becomes possible to flexibly alter the evaluation criterion and the evaluation value by altering records retained in the evaluation criterion table.

Figure 15:
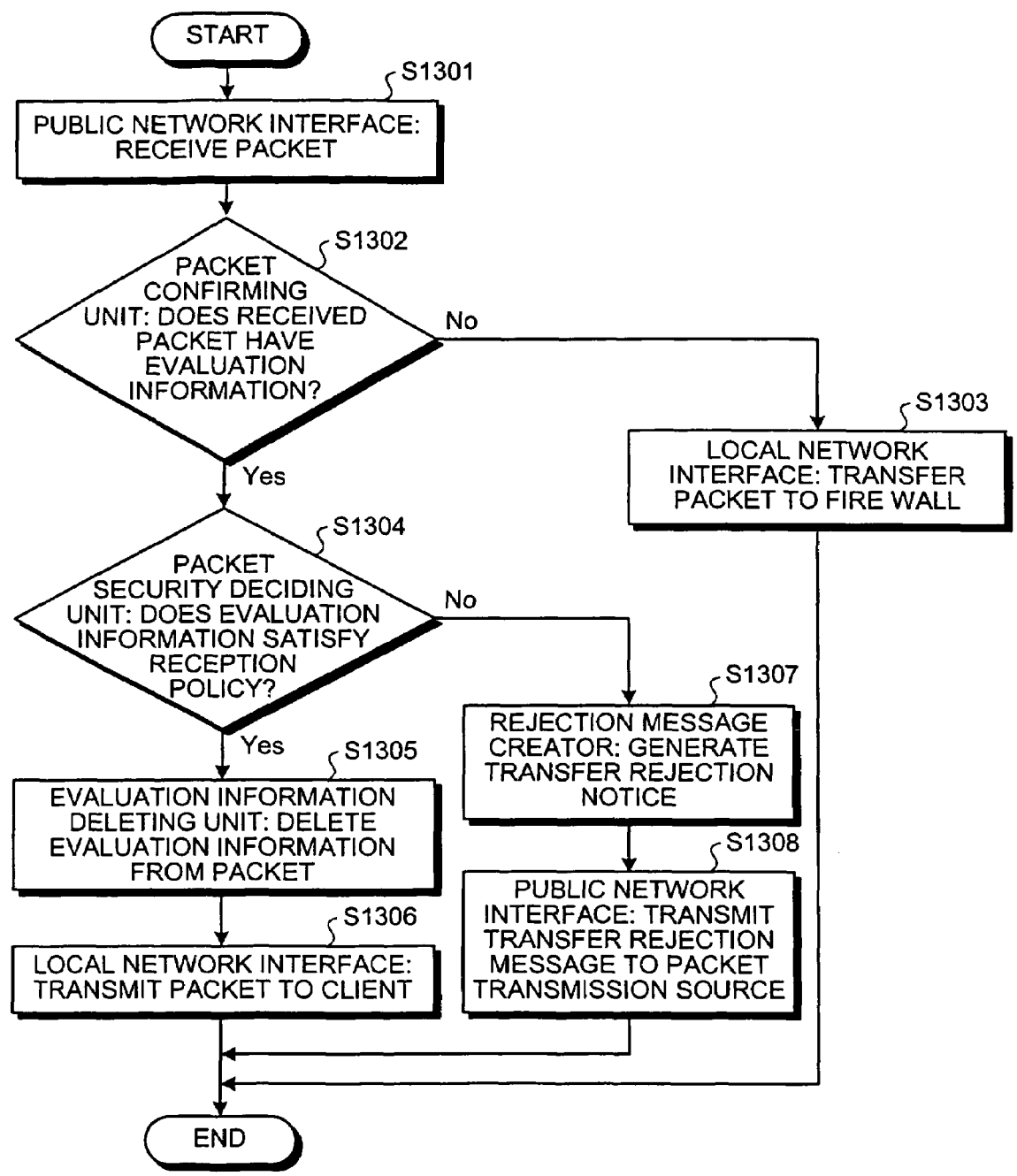
FIG. 15 is a flowchart that depicts general processing conducted when a packet filtering apparatus according to the first embodiment has received a packet transmitted from another network.

Processing conducted in the packet filtering apparatus 100 according to the present embodiment having the configuration heretofore explained when a packet is received from another network is explained. FIG. 15 is a flowchart that depicts general processing conducted in the packet filtering apparatus 100 according to the present embodiment when a packet is received from another network.

The public network interface 202 receives a packet from the public network 13 (step S1301).

The packet confirming unit 221 determines whether a received packet has evaluation information added thereto based on whether the control header 302 is included between the IP header 301 and the payload 304 in the received packet (step S1302). If the received packet is judged not to have evaluation information added thereto (No at step S1302), the local network interface 201 transmits the received packet to the firewall 81 (step S1303).

If the received packet is judged to have evaluation information added thereto (Yes at step S1302), the packet security deciding unit 222 determines whether the evaluation value in the evaluation information satisfies the security criterion according to the reception policy (step S1304). A processing procedure for a decision whether the evaluation value in the evaluation information satisfies the security criterion according to the reception policy conducted by the packet security deciding unit 222 is explained later.

If the evaluation value in the evaluation information is judged to satisfy the security criterion according to the reception policy (Yes at step S1304), the evaluation information deleting unit 224 deletes the evaluation information added to the received packet (step S1305). The local network interface 201 transfers the packet with the evaluation information deleted to the client of transmission destination (step S1306).

If the evaluation value in the evaluation information is judged not to satisfy the security criterion according to the reception policy (No at step S1304), the rejection notice generator 223 generates a transfer rejection notice to the effect that the transfer of the received packet is rejected (step S1307). The public network interface 202 transmits the generated transfer rejection notice to the transmission source of the received packet via the public network 13 (step S1308).

By conducting the processing procedure explained above, it becomes possible to judge the security based on the security information about the transmission source or user authentication, with reference to the evaluation information included in the received packet. Since the evaluation information is deleted, the clients 51A to 51C receiving a packet receives an ordinary packet, and need not conduct special processing. By transmitting the transfer rejection notice to the transmission source, it becomes possible for the transmitter to know the fact that the transfer is rejected. As a result, it becomes possible for the user to enhance the security of the client used by the user or enhance the security by user authentication.

In the present embodiment, the processing conducted by the packet confirming unit 221 is not restricted to the processing of transferring a packet having no evaluation information added thereto, to the firewall 81. For example, the processing conducted by the packet confirming unit 221 may be, for example, processing of deleting a packet having no evaluation information added thereto. When a packet is deleted, the transmitter may be notified that the packet has no evaluation information added thereto.

Figure 16:
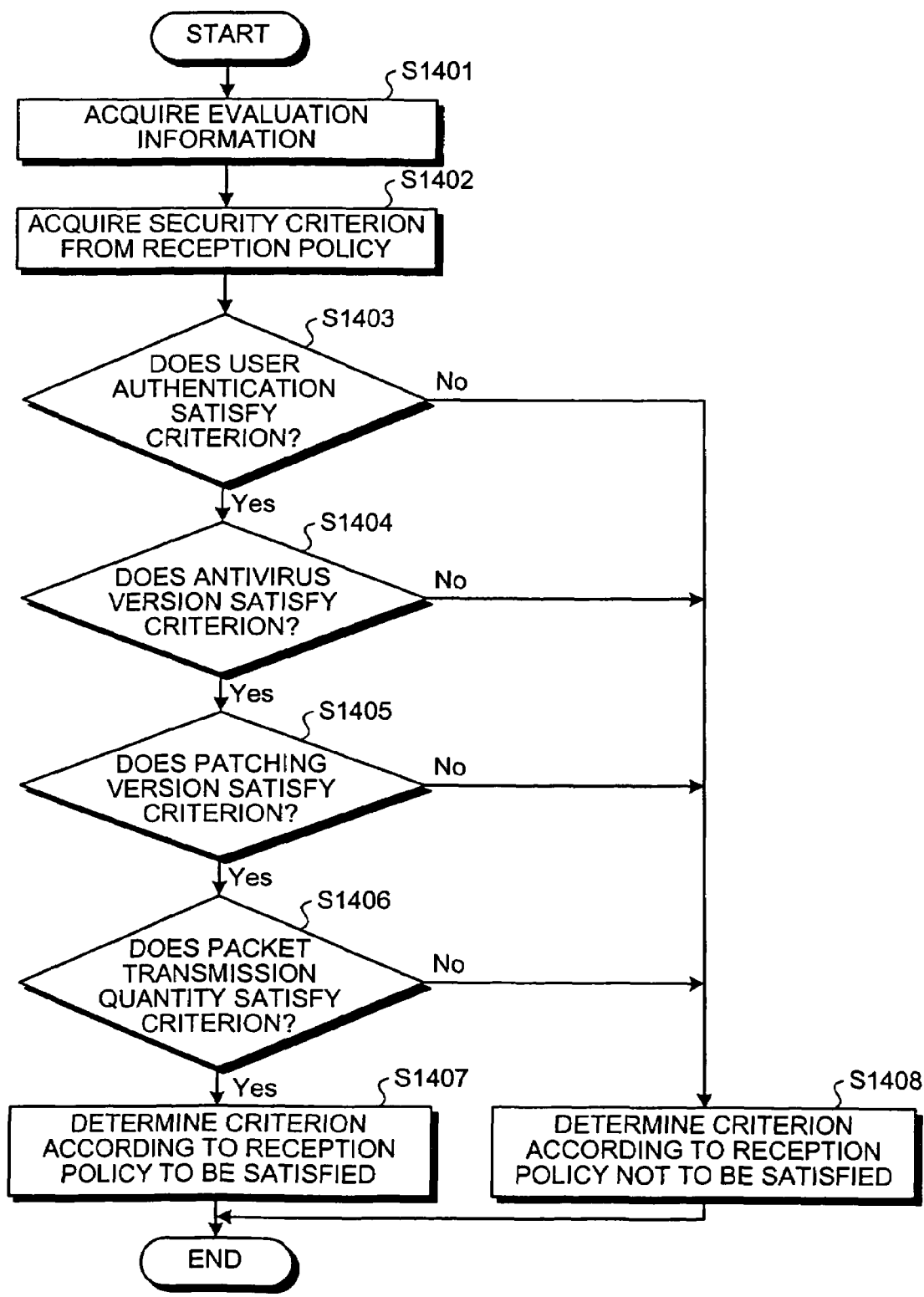
FIG. 16 is a flowchart that depicts a processing procedure for a decision whether security is satisfied conducted by a packet security deciding unit 222 in a packet filtering apparatus according to the first embodiment.

A processing procedure for the decision whether the received packet satisfies the security conducted by the packet security deciding unit 222 at step S1304 in FIG. 15 is explained. FIG. 16 is a flowchart that depicts a processing procedure for the decision whether the security is satisfied conducted by the packet security deciding unit 222 in the packet filtering apparatus 100 according to the present embodiment.

The packet security decision unit 222 acquires a security criterion to be used to judge the security of the packet, from the reception policy stored in the storage unit 250.

The packet security decision unit 222 acquires evaluation information, and an IP address and a port number that indicate the transmission destination, from the received packet (step S1401). The packet security decision unit 222 acquires the evaluation information from between the IP header 301 and the payload 304, and acquires the IP address and the port number from the IP header 301 in the packet.

The packet security deciding unit 222 acquires a security criterion corresponding to the acquired IP address and port number from the reception policy (step S1402). In an example of a specific security criterion acquisition method, it is attempted to acquire a security criterion that coincides in IP address and port number. If there is no security criterion that coincides in both IP address and port number, it is attempted to acquire a security criterion that coincides only in IP address. If there is no security criterion that coincides only in IP address, it is attempted to acquire a security criterion that coincides only in port number. If there is no security criterion that coincides only in port number, it is attempted to acquire a security criterion having no IP address and port number set for it.

The packet security deciding unit 222 determines whether the evaluation value for user authentication included in the evaluation information satisfies the security criterion for user authentication acquired from the reception policy (step S1403). For example, it is now supposed that the evaluation value for user authentication in the evaluation information is 'B.' If the criterion value for user authentication acquired from the reception policy is 'B' or 'C,' the security criterion is judged to be satisfied. If the criterion value for user authentication acquired from the reception policy is 'A,' the security criterion is judged not to be satisfied. In ensuing decisions as well, similar decisions are conducted.

If the user authentication is judged to satisfy the security criterion (Yes at step S1403), the packet security deciding unit 222 determines whether the evaluation value for the antivirus software included in the evaluation information satisfies the security criterion for the antivirus version acquired from the reception policy (step S1404).

If the antivirus version is judged to satisfy the security criterion (Yes at step S1404), the packet security deciding unit 222 determines whether the evaluation value for the patching version included in the evaluation information satisfies the security criterion for the patching version acquired from the reception policy (step S1405).

If the patching version is judged to satisfy the security criterion (Yes at step S1405), the packet security deciding unit 222 determines whether the evaluation value for the packet transmission quantity included in the evaluation information satisfies the security criterion for the packet transmission quantity acquired from the reception policy (step S1406).

If the packet transmission quantity is judged to satisfy the security criterion (Yes at step S1406), the packet security deciding unit 222 judges the security criterion according to the reception policy to be satisfied (step S1407).

When the user authentication is judged not to satisfy the security criterion (No at step S1403), when the antivirus version is judged not to satisfy the security criterion (No at step S1404), when the patching version is judged not to satisfy the security criterion (No at step S1405), and when the packet transmission quantity is judged not to satisfy the security criterion (No at step S1406), the packet security deciding unit 222 judges the security criterion according to the reception policy not to be satisfied (step S1408).

Owing to the procedure explained above, it becomes possible for the packet security deciding unit 222 to evaluate the security of the packet suitably. Owing to use of the security criterion retained in the reception policy in the evaluation of the security, it becomes possible to alter the criterion for the security flexibly by altering the set criterion and criterion value retained in the reception policy.

Instead of judging the criterion for the security to be satisfied only when all security criteria are satisfied, the packet security deciding unit 222 may judge the security criterion to be satisfied when at least a predetermined number of, for example, at least three security criteria are satisfied. The packet security deciding unit 222 may provide the evaluation values such as A, B, C and so on with respective fixed points and judge the security criterion to be satisfied when the total points has exceeded predetermined points.

The packet filtering apparatus according to the present embodiment may have a hardware configuration using an ordinary computer, which includes a control apparatus such as a CPU, a storage apparatus such as a ROM (Read Only Memory) and a RAM, and a HDD.

It is also possible to provide a packet filtering program to be executed in the packet filtering apparatus according to the present embodiment by recording it as a file having a form that can be installed or a form that can be executed, on a recording medium that can be read by a computer, such as a CD-ROM, a flexible disk (FD), a CD-R, or a DVD (Digital Versatile Disk).

A packet filtering program to be executed on the packet filtering apparatus according to the present embodiment may be provided by storing the program on a computer connected to a network such as the Internet and downloading the program via the network. Further the packet filtering program to be executed on the packet filtering apparatus 100 according to the present embodiment may be provided or distributed via a network such as the Internet.

The packet filtering program according to the present embodiment may be previously incorporated in a ROM or the like and provided.

The packet filtering program to be executed on the packet filtering apparatus according to the present embodiment has a module configuration including the units explained above (the local network interface 201, the public network interface 202, the user authenticating unit 214, the security information acquiring unit 213, the evaluation information generator 212, the evaluation information adder 211, the user authentication information setting unit 215, the evaluation criterion setting unit 217, the packet confirming unit 221, the packet security deciding unit 222, the rejection notice generator 223, the evaluation information deleting unit 224 and the reception policy setting unit 225). As for the actual hardware, a CPU (processor) reads out the packet filtering program from the storage medium and executes the program, and consequently the units are loaded onto a main storage apparatus and the units are generated on the main storage apparatus.

The packet filtering apparatus 100 according to the present embodiment acquires information concerning the communication device or user that has transmitted a packet based on the evaluation information included in the received packet. Thus, it becomes possible to determine whether the packet is secure.

Although the packet filtering apparatus 100 makes it possible to determine whether the packet is secure, the packet filtering apparatus 100 transmits the packet to the client of transmission destination after deleting the evaluation information. Therefore, special processing is not required on the client side.

Since the packet filtering apparatus 100 includes the client investigating unit 216, it becomes possible to easily acquire the security information about the client. By storing the acquired security information in the storage unit 250, it becomes unnecessary to investigate the security information about the clients 51A to 51C whenever a packet is transmitted, and it becomes possible to generate rapid evaluation information. By including the user authenticating unit 214, user authentication becomes possible. By including the reception policy setting unit 225, it becomes possible to suitably alter the security criterion.

When evaluating the security of a packet received from clients 51A to 51C, in the packet filtering apparatus, the packet filtering program and the packet filtering method according to the present embodiment, the packet filtering apparatus 100 conducts evaluation based on only the security of clients 51A to 51C that has transmitted the packet or user authentication.

When evaluating the security of a packet received from clients 51A to 51C, the packet filtering apparatus according to a second embodiment conducts evaluation based on not only the security of clients 51A to 51C that has transmitted the packet or user authentication, but also a combination thereof with information retained in the packet.

In the present embodiment, the information retained in the packet to be combined is supposed to be an IP address. However, it is not restricted to the IP address, but a combination with various kinds of information such as a port number is conceivable.

Figure 17:
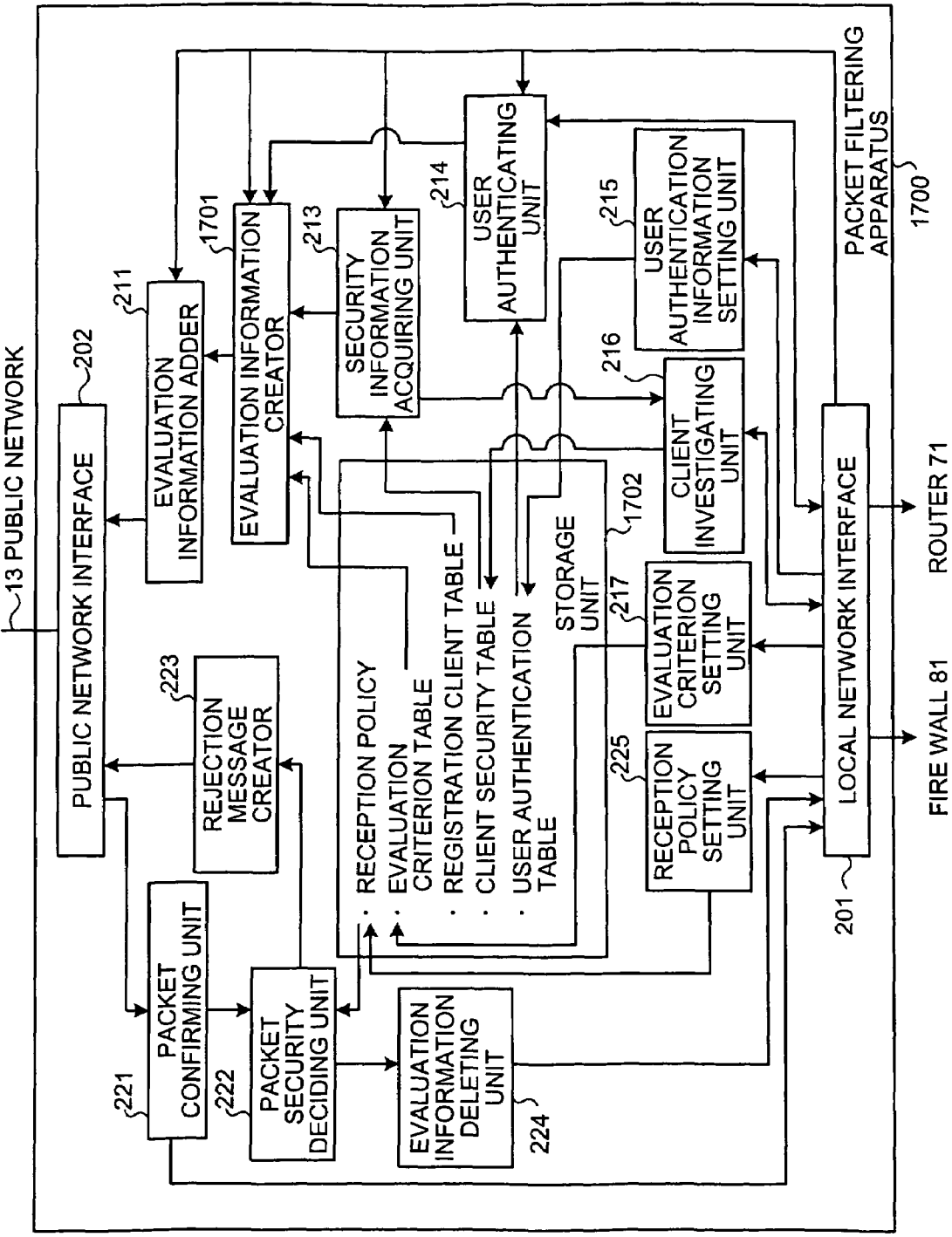
FIG. 17 is a block diagram that depicts a configuration of a packet filtering apparatus according to a second embodiment.

FIG. 17 is a block diagram of a packet filtering apparatus 1700 according to the second embodiment. In the second embodiment, a packet filtering apparatus 1700 is used instead of the packet filtering apparatus 100 shown in FIG. 1. Hereafter, the packet filtering apparatus 1700 having a configuration different from that in the first embodiment is explained. It is supposed that a packet filtering apparatus that conducts processing similar to that conducted by the packet filtering apparatus 1700 is installed in the network B as well.

The packet filtering apparatus 1700 according to the present embodiment differs from the packet filtering apparatus 100 in that an evaluation information generator 1701 conducts processing different from that conducted by the evaluation information generator 212 and a storage unit 1702 stores tables different from those stored in the storage unit 250.

The evaluation information generator 1701 generates evaluation information for a packet received from the clients 51A to 51C. The evaluation information generator 212 in the first embodiment generates evaluation information based on a result of user authentication and security information. In the second embodiment, however, the evaluation information generator 1701 acquires an evaluation value based on security information, acquires an evaluation value based on a combination of the user authentication result and an IP address that indicates the transmission source of the packet, and generates evaluation information based on these evaluation values. A detailed procedure for evaluation value acquisition is described later.

The storage unit 1702 stores all of the reception policy, the evaluation criterion table, the client security table and the user authentication table stored in the storage unit 250 in the first embodiment. In addition, the storage unit 1702 stores a registration client table.

FIG. 18 shows a configuration example of the registration client table. IP addresses of clients recognized in the network A as regular clients are previously registered in the present table. By making a decision whether the IP address in a received packet is already registered in the registration client table, and altering the evaluation value according to a result of this decision, it becomes possible to acquire an evaluation value combined with information retained in the packet.

In the packet filtering apparatus 1700 according to the second embodiment having the configuration heretofore explained, processing conducted until evaluation information is added to a packet received from the clients 51A to 51C and a resultant packet is transmitted is conducted according to a processing procedure similar to that for the packet filtering apparatus 100 in the first embodiment shown in FIG. 11. However, the processing conducted in the packet filtering apparatus 1700 differs from that conducted in the packet filtering apparatus 100 only in detailed processing conducted to generate evaluation information conducted at step S904 by the evaluation information generator 1701.

In the second embodiment, the evaluation value for the user authentication is combined with the IP address in the received packet. Therefore, an acquisition procedure for the evaluation value for the user authentication is explained. Acquisition procedures for evaluation values for the antivirus version, patching version and packet transmission quantity are the same as those in the first embodiment.

FIG. 19 is a flowchart that depicts a processing procedure according to which the evaluation information generator 1701 in the packet filtering apparatus 1700 according to the second embodiment generates evaluation information. Acquisition procedures for evaluation values for evaluation criteria other than the user authentication is not explained.

The evaluation information generator 1701 acquires a result of user authentication from the user authenticating unit 214 (step S1801). In other words, the evaluation information generator 1701 acquires one from among success in authentication using 'public key', success in authentication using 'password', and 'failure' in both authentication using a public key and authentication using a password.

The evaluation information generator 1701 acquires an evaluation value from the evaluation criterion table based on the user authentication result (step S1802).

The evaluation information generator 1701 determines whether the IP address in the received packet is already registered in the registration client table (step S1803).

If the IP address is judged to be previously registered (Yes at step S1803), processing is not especially conducted. If the IP address is judged not to be previously registered (No at step S1803), the access is regarded as access conducted from an unsuitable client and the evaluation value for the user authentication acquired at step S1802 is lowered by one level (step S1804). Specifically, if the acquired value is 'A' or 'B', the acquired value is lowered to 'B' or 'C', respectively. If the acquired value is 'C', the acquired value is kept at 'C'.

The evaluation information generator 1701 generates evaluation information based on the acquired evaluation value for user authentication and evaluation values for other evaluation criteria (step S1805).

Even if, for example, it is attempted to install a client informally in the network A and transmit a packet, it becomes possible by conducting processing according to the procedure explained above to add evaluation information suitably with due regard to the fact that the client is an informal client.

Processing conducted in the packet filtering apparatus 1700 according to the present embodiment having the configuration heretofore explained when a packet is received from another network is conducted according to a processing procedure similar to the processing procedure shown in FIG. 15 for the packet filtering apparatus 100 according to the first embodiment. Therefore, explanation thereof is not repeated.

If a client is not registered previously in the registration client table, the evaluation value is lowered in the present embodiment However, the processing is not restricted to evaluation lowering. For example, processing of raising the evaluation value may be conducted when a client is previously registered in the registration client table.

In the present embodiment, the evaluation value acquired based on the security information about the client and user authentication at the time of evaluation information generation is altered based on a decision whether an IP address retained in a packet is proper. Therefore, it becomes possible to set a flexible evaluation value, and reliability of the evaluation information becomes higher.

The present invention is not restricted to the embodiments explained above, but various modification examples exemplified hereafter are possible.

In the embodiments explained above, the administrator sets or updates the reception policy and the evaluation criterion table. However, the reception policy and the evaluation criterion table may be updated in synchronism with a packet filtering apparatus on another network via the public network. This modification example has a configuration in which the network A and network B can be connected by a VPN. When arranging an encryption key based on authentication in response to a request for communication using the VPN, a reception policy criterion update notice that indicates information about a reception policy and an evaluation criterion table currently used by the packet filtering apparatus is transmitted together with the encryption key.

Figure 20:
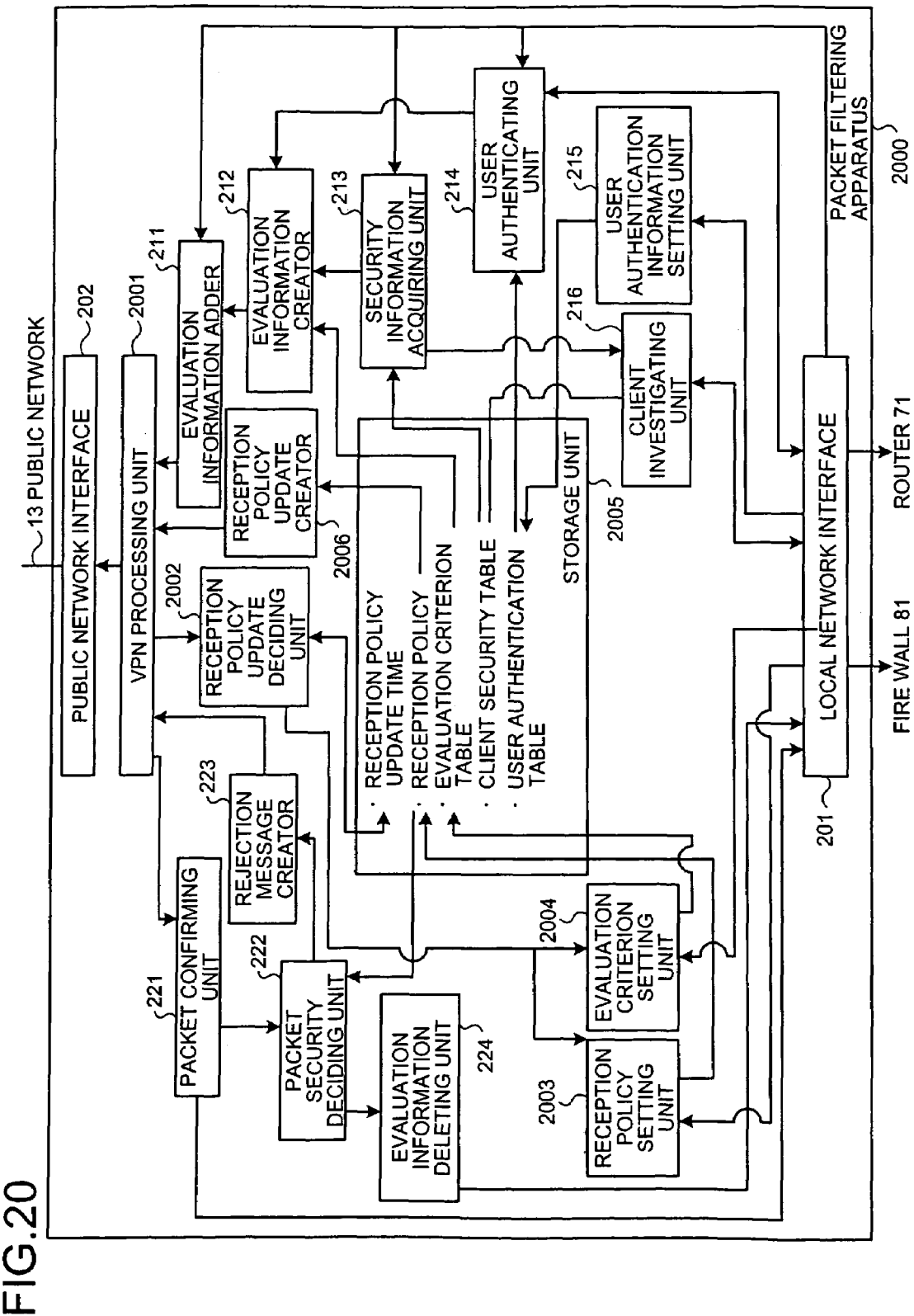
FIG. 20 is a block diagram that depicts a configuration of a packet filtering apparatus according to a first modification example.

FIG. 20 is a block diagram that depicts a configuration of a packet filtering apparatus according to this modification example. A packet filtering apparatus 2000 shown in FIG. 20 sets or updates the reception policy and the evaluation criterion table by using the received reception policy criterion update notice.

The reception policy criterion update notice includes update information, which indicates information required to update the reception policy and the evaluation criterion table, and reception policy update time, which indicates time when the reception policy and the evaluation criterion table were updated the last time. The reception policy update information in the reception policy criterion update notice includes record information that is not specified in IP address and that is specified only in port number, and record information that is specified neither in IP address nor in port number, in a reception policy retained in the packet filtering apparatus 2000. Update information about the evaluation criterion table includes all record information in the evaluation criterion table retained in the packet filtering apparatus 2000.

The reason why the update information for the reception policy is restricted to record information that is not specified in IP address is that IP addresses that indicate clients in the networks are different. If all IP addresses and roles of clients in the local network coincide, or a correspondence table between IP addresses of clients in networks is retained, the update information may be generated by using all record information retained in the reception policy.

The packet filtering apparatus 2000 in the present modification example differs from the packet filtering apparatus 100 in the first embodiment in that a VPN processing unit 2001, a reception policy update deciding unit 2002 and a reception policy update generator 2006 are newly provided, a reception policy setting unit 2003 and an evaluation criterion setting unit 2004 conduct processing different from that conducted by the reception policy setting unit 225 and the evaluation criterion setting unit 217 in the first embodiment, and a storage unit 2005 is different from the storage unit 250 in the first embodiment in stored information.

When transmitting a packet from the packet filtering apparatus 2000, the VPN processing unit 2001 encrypts the packet, adds an IP header to the packet, and transmits the resultant packet from the public network interface 202. When receiving a packet, the VPN processing unit 2001 deletes an IP header, decrypts the packet, and outputs the resultant received packet to the packet confirming unit 221. If a reception policy criterion update notice is received together with an encryption key at the time of authentication, the VPN processing unit 2001 outputs the reception policy criterion update notice to the reception policy update deciding unit 2002. If a reception policy criterion update notice is input from the reception policy update generator 2006, which is explained later, the VPN processing unit 2001 transmits the reception policy criterion update notice together with the encryption key via the public network interface 202.

When a reception policy criterion update notice is input, the reception policy update deciding unit 2002 compares reception policy update time retained in the reception policy criterion update notice with reception policy update time retained in the storage unit 2005, which is explained later. If the reception policy update time retained in the reception policy criterion update notice is later than the reception policy update time retained in the storage unit 2005, the reception policy update deciding unit 2002 outputs reception policy update information retained in the reception policy criterion update notice to the reception policy setting unit 2003, and outputs update information for the evaluation criterion table retained in the reception policy criterion update notice to the evaluation criterion setting unit 2004.

The reception policy setting unit 2003 is the same as that in the embodiments in that the administrator can set a reception policy therein. In addition, when update information for the reception policy is input from the reception policy update deciding unit 2002, the reception policy setting unit sets a reception policy based on the update information for the reception policy. As a result, the burden on the administrator is reduced and update is conducted suitably.

The evaluation criterion setting unit 2004 is the same as that in the embodiments in that the administrator can set an evaluation criterion management In addition, when update information for the evaluation criterion table is input from the reception policy update deciding unit 2002, the evaluation criterion setting unit sets an evaluation criterion table based on the update information for the evaluation criterion table. As a result, the burden on the administrator is reduced and update is conducted suitably.

The storage unit 2005 stores all information stored in the storage unit 250 in the first embodiment. In addition, the storage unit 2005 stores reception policy update time.

The reception policy update time is time when the reception policy and the evaluation information criterion table are updated.

The reception policy update generator 2006 generates a reception policy criterion update notice based on the reception policy, evaluation criterion information table and reception policy update time. The generated reception policy criterion update notice is transmitted together with an encryption key by the VPN processing unit 2001 when authentication processing is conducted by the VPN.

Figure 21:
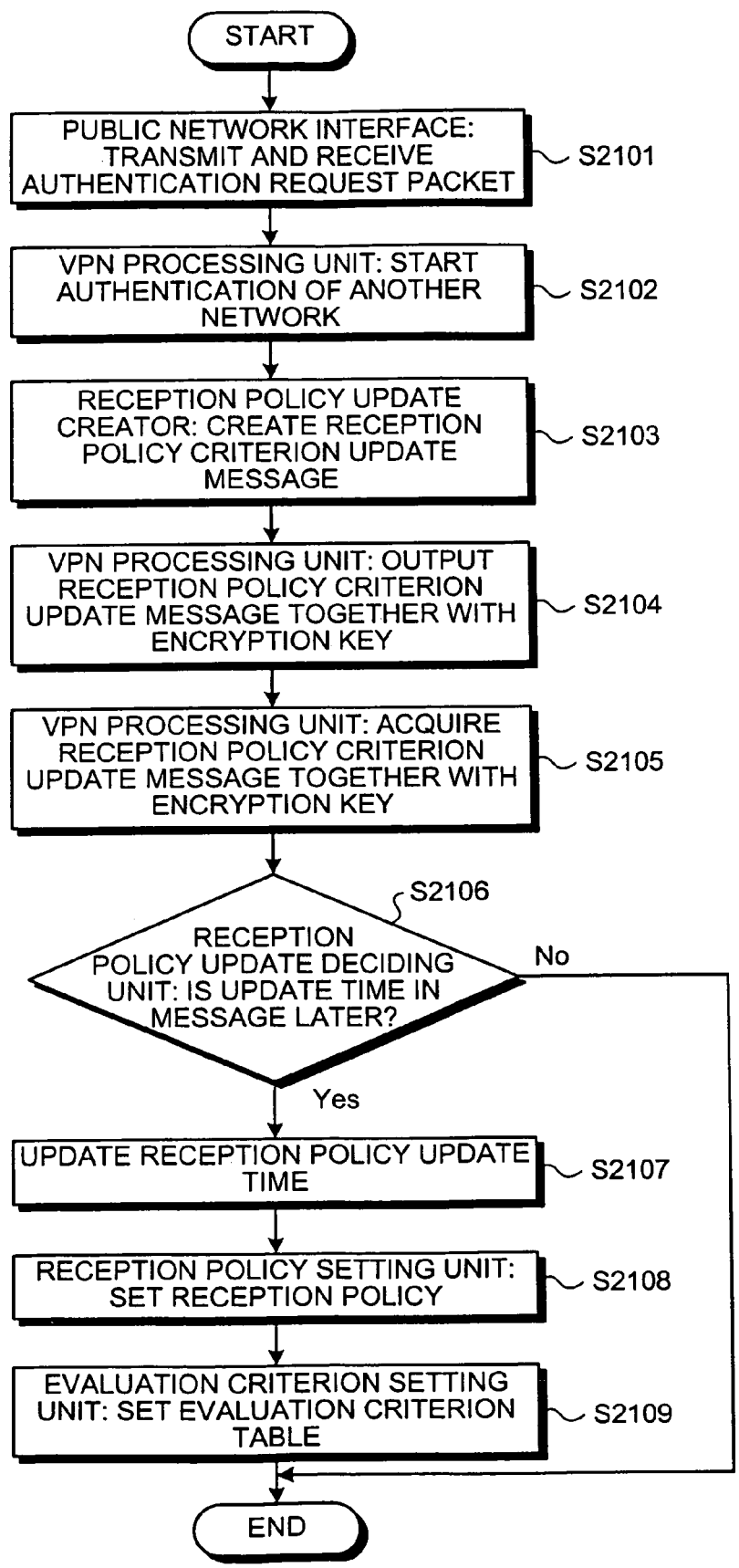
FIG. 21 is a flowchart that depicts a processing procedure for reception of a reception policy criterion update notice and update of a reception policy and an evaluation information criterion table, when conducting communication using a VPN in a packet filtering apparatus according to the first modification example.

FIG. 21 is a flowchart that depicts a processing procedure for reception of a reception policy criterion update notice and update of the reception policy and evaluation information criterion table, when the packet filtering apparatus 2000 according to the present modification example conducts communication using the VPN.

The public network interface 202 transmits or receives an authentication request to conduct communication using the VPN with another network, such as the network B (step S2101).

After outputting or inputting an authentication request via the public network interface 202, the VPN processing unit 2001 starts authentication with the network B (step S2102).

The reception policy update generator 2006 generates a reception policy criterion update notice based on the reception policy, evaluation criterion information table and reception policy update time (step S2103).

After the authentication is started, the VPN processing unit 2001 outputs the generated reception policy criterion update notice together with an encryption key to the network B (step S2104), and acquires a reception policy criterion update notice together with an encryption key via the public network interface 202 (step S2105).

The reception policy update deciding unit 2002 determines whether the reception policy update time retained in the acquired reception policy criterion update notice is later than the reception policy update time retained in the storage unit 2005 (step S2106).

If the reception policy update time retained in the acquired reception policy criterion update notice is judged to be later than the reception policy update time retained in the storage unit 2005 (Yes at step S2106), the reception policy update deciding unit 2002 updates the reception policy update time retained in the storage unit 2005 by using the reception policy update time retained in the reception policy criterion update notice (step S2107).

After the time update, the reception policy update deciding unit 2002 outputs the reception policy update information retained in the reception policy criterion update notice to the reception policy setting unit 2003, and the reception policy setting unit 2003 sets the reception policy based on the input reception policy update information (step S2108). In addition, the reception policy update deciding unit 2002 outputs update information for the evaluation criterion table retained in the reception policy criterion update notice to the evaluation criterion setting unit 2004. the evaluation criterion setting unit 2004 sets the evaluation criterion table based on the input update information for the evaluation criterion table (step S2109).

If the reception policy update time retained in the acquired reception policy criterion update notice is judged not to be later than the reception policy update time retained in the storage unit 2005 (No at step S2106), processing is not especially conducted and the processing flow is finished.

Owing to the procedure heretofore explained, the reception policy and the evaluation criterion table can be set without relying upon the administrator. In addition, it becomes possible to synchronize in reception policy and evaluation criterion table with a packet filtering apparatus installed in another network. Since the same reception policy and evaluation criterion table as those in another network are used, reliability of the evaluation values are increased and the security is further improved.

Even if there is an environmental change, such as occurrence of virus, on the network, the reception policy and the evaluation criterion table are updated in synchronism in the present modification example. Therefore, it becomes possible to set a suitable security criterion at the time of packet reception, and add evaluation information using a suitable evaluation value at the time of packet transmission.

In the update of the reception policy and the evaluation criterion table, the reception policy and the evaluation criterion table may be updated according to a reception policy criterion update notice delivered from a delivery server 2250 installed on the public network 13.

Figure 22:
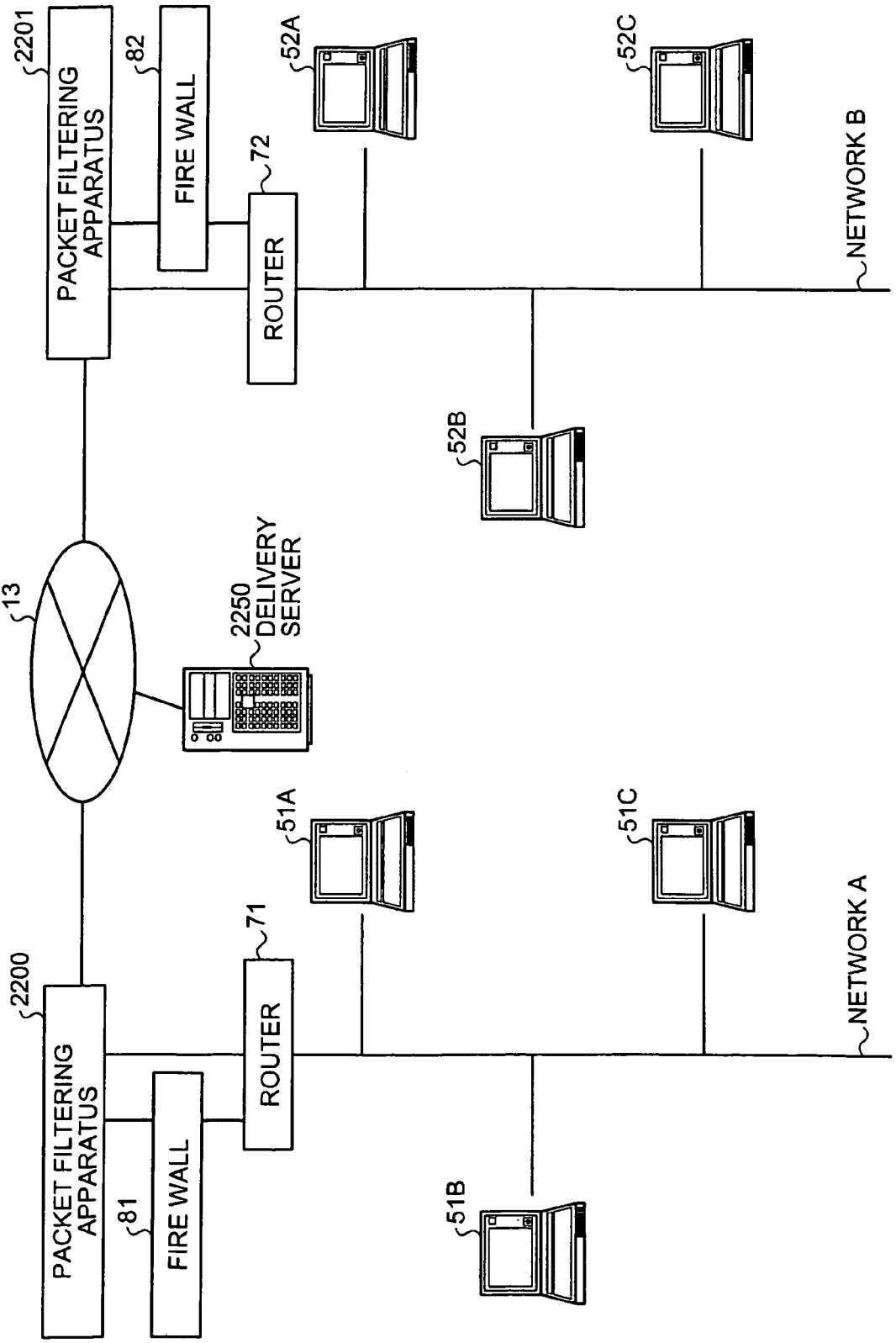
FIG. 22 shows a configuration of a network according to a second modification example.

FIG. 22 shows a configuration of a network according to this modification example. In FIG. 22, a delivery server 2250 is newly installed on the public network 13, and a reception policy criterion update notice is transmitted to packet filtering apparatuses 2200 and 2201. When the reception policy criterion update notice is received from the delivery server 2250, each of the packet filtering apparatuses 2200 and 2201 updates the reception policy and the evaluation criterion table based on this notice, unlike the packet filtering apparatuses in the embodiments explained earlier.

Figure 23:
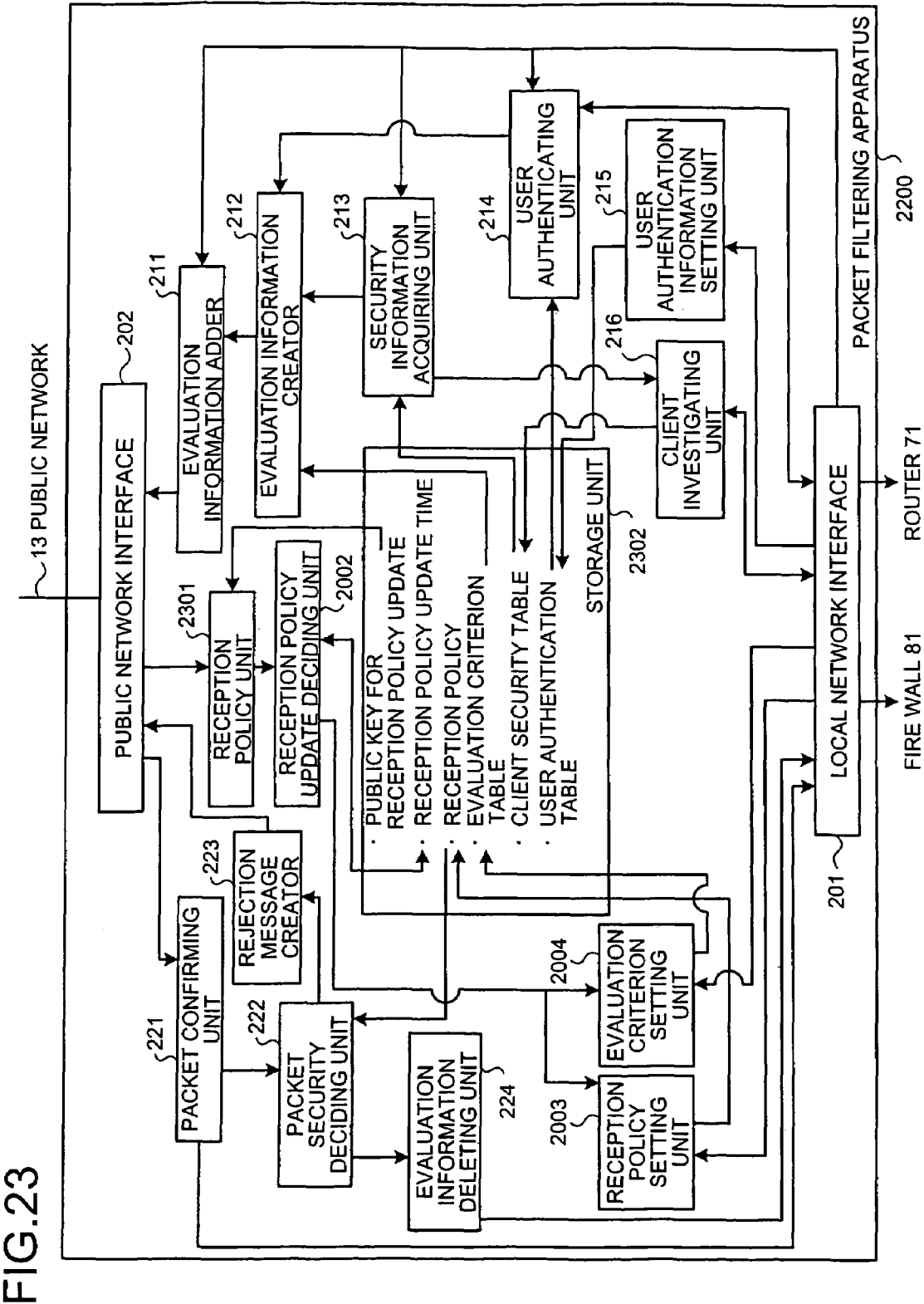
FIG. 23 is a block diagram that depicts a configuration of a packet filtering apparatus according to the second modification example.

FIG. 23 is a block diagram of a packet filtering apparatus according to this modification example. A packet filtering apparatus 2200 shown in FIG. 23 differs from the packet filtering apparatus 2000 shown in FIG. 20 in that the VPN processing unit 2001 is removed, a reception policy authenticating unit 2301 is newly provided, and a storage unit 2302 stores different information.

The reception policy authenticating unit 2301 conducts authentication by using a public key and an electronic signature transmitted together with a reception policy criterion update notice from the delivery server 2250 via the public network interface 202. The authentication is conducted by using a public key for reception policy update, which is explained later, retained in the storage unit 2302. The authentication method is not especially restricted. In the present modification example, the conventional well-known authentication method using a public key and an electronic signature is used.

The storage unit 2302 stores all information stored in the storage unit 250 shown in FIG. 20. In addition, the storage unit 2302 stores a public key for reception policy update.

The public key for reception policy update is used to conduct authentication on the electronic signature transmitted from the delivery server 2250.

The reception policy criterion update notice in the present modification example has a configuration similar to that of the reception policy criterion update notice in the first modification example.

Figure 24:
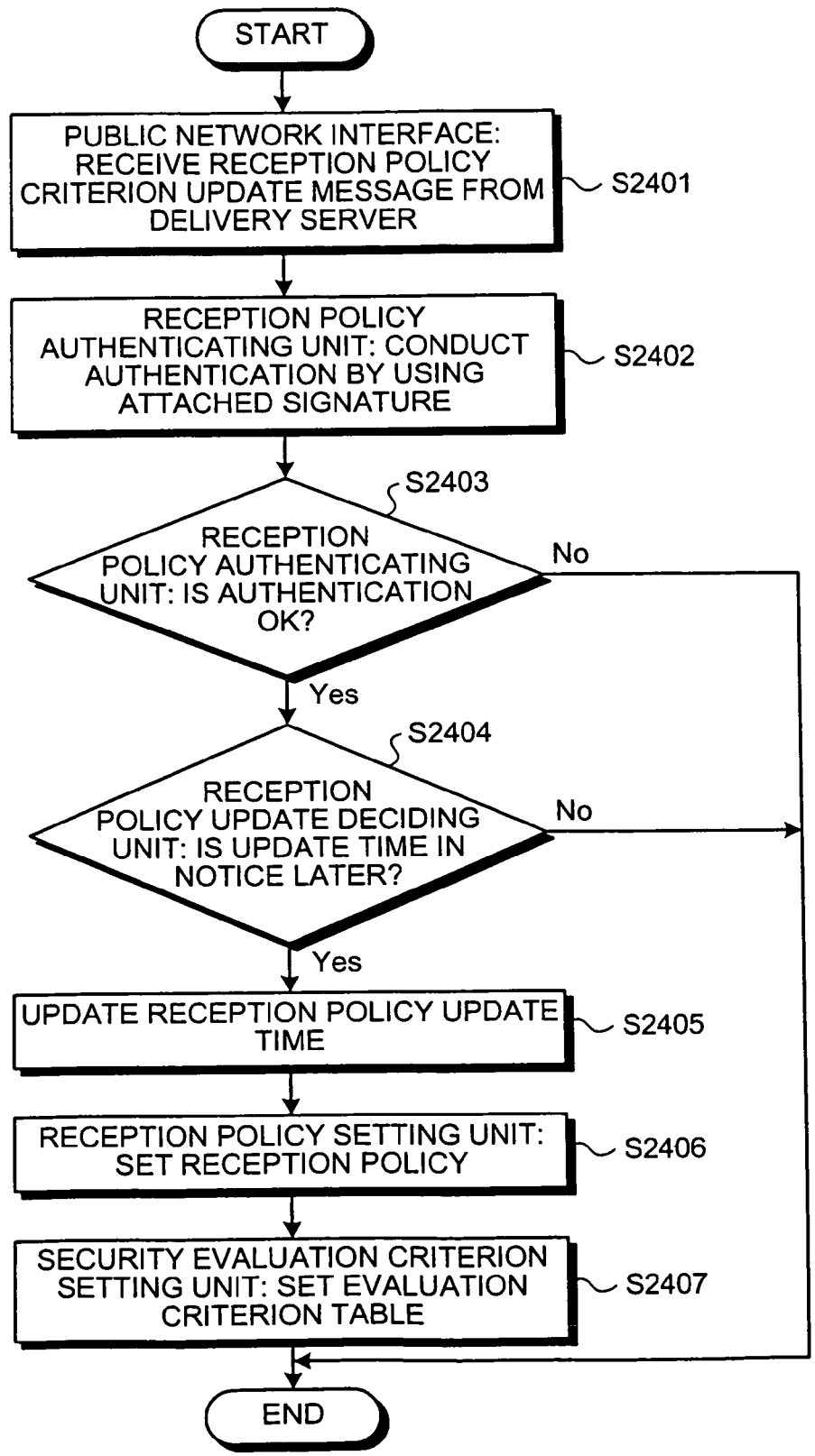
FIG. 24 is a flowchart that depicts a processing procedure for reception of a reception policy criterion update notice from a delivery server and update of a reception policy and an evaluation information criterion table, conducted by a packet filtering apparatus according to the second modification example.

FIG. 24 is a flowchart that depicts a processing procedure according to which the packet filtering apparatus 2200 according to the present modification example receives a reception policy criterion update notice from the delivery server 2250 and updates the reception policy and the evaluation information criterion table.

The public network interface 202 receives a reception policy criterion update notice and an electronic signature from the delivery server 2250 (step S2401).

The reception policy authenticating unit 2301 conducts authentication on the received electronic signature by using a public key for reception policy update (step S2402).

The reception policy authenticating unit 2301 determines whether authentication is conducted properly (step S2403).

If the authentication is judged to be conducted properly (Yes at step S2403), the reception policy update deciding unit 2002 determines whether reception policy update time retained in the received reception policy criterion update notice is later than reception policy update time retained in the storage unit 2005 (step S2404).

If the reception policy update time retained in the received reception policy criterion update notice is judged to be later than reception policy update time retained in the storage unit 2005 (Yes at step S2404), update of the reception policy update time and setting of the reception policy and the evaluation criterion table are conducted in the same way as steps S2107 to S2109 shown in FIG. 21 (steps S2405 to S2407).

If authentication is judged not to be conducted properly (No at step S2403), or if the reception policy update time retained in the received reception policy criterion update notice is judged not to be later than reception policy update time retained in the storage unit 2005 (No at step S2404), processing is not conducted especially and the processing flow is finished.

Owing to the procedure heretofore explained, the work of the administrator is reduced and it becomes possible to set the reception policy and the evaluation criterion table suitably to the network environment. Since all setting is altered simultaneously with a packet filtering apparatus installed in another network, the security is improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A packet filtering method comprising:
   receiving a first packet from a first communication device located in a first network;
   acquiring unit acquiring sender information including at least one of security information about the first communication device and authentication information about a user of the first communication device;
   creating evaluation information indicating security evaluation of the first communication device based on an evaluation criterion for the sender information;
   adding the evaluation information to the first packet to generate a second packet;
   transmitting the second packet to a second network;
   receiving a third packet from a second communication device located in the second network;
   determining whether the evaluation information included in the third packet is higher than a security criterion, the evaluation information indicating security evaluation of the second communication device;
   deleting the evaluation information from the third packet to generate a fourth packet when the evaluation information is higher than the security criterion; and
   transmitting the fourth packet to the first network.

2. A computer program product having a computer readable medium including programmed instructions, wherein the instructions, when executed by a computer, cause the computer to perform:
   receiving a first packet from a first communication device located in a first network;
   acquiring unit acquiring sender information including at least one of security information about the first communication device and authentication information about a user of the first communication device;
   creating evaluation information indicating security evaluation of the first communication device based on an evaluation criterion for the sender information;
   adding the evaluation information to the first packet to generate a second packet;
   transmitting the second packet to a second network;
   receiving a third packet from a second communication device located in the second network;
   determining whether the evaluation information included in the third packet is higher than a security criterion, the evaluation information indicating security evaluation of the second communication device;
   deleting the evaluation information from the third packet to generate a fourth packet when the evaluation information is higher than the security criterion; and
   transmitting the fourth packet to the first network.

* * * * *